(12) United States Patent
Sakamoto

(10) Patent No.: US 8,736,969 B2
(45) Date of Patent: May 27, 2014

(54) ZOOM LENS AND IMAGE PICKUP APPARATUS INCLUDING THE SAME

(71) Applicant: Canon Kabushiki Kaisha, Tokyo (JP)

(72) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/749,167

(22) Filed: Jan. 24, 2013

(65) Prior Publication Data

US 2013/0194484 A1 Aug. 1, 2013

(30) Foreign Application Priority Data

Jan. 26, 2012 (JP) ................................ 2012-014071

(51) Int. Cl.
*G02B 15/14* (2006.01)

(52) U.S. Cl.
USPC ......................................... 359/683; 359/676

(58) Field of Classification Search
USPC ................................................. 359/676, 683
See application file for complete search history.

(56) References Cited

U.S. PATENT DOCUMENTS

| | | | |
|---|---|---|---|
| 5,917,658 A * | 6/1999 | Yamanashi | 359/676 |
| 6,236,516 B1 | 5/2001 | Misaka | |
| 8,179,609 B2 | 5/2012 | Wakazono | |
| 2011/0090373 A1 | 4/2011 | Wakazono | |
| 2011/0317279 A1* | 12/2011 | Takahashi | 359/683 |

FOREIGN PATENT DOCUMENTS

| | | |
|---|---|---|
| EP | 2 312 365 A1 | 4/2011 |
| JP | 2050120 A | 2/1990 |
| JP | 4147110 A | 5/1992 |

OTHER PUBLICATIONS

OA issued in Counterpart EP 13000367.6 dated Jun. 13, 2013.

* cited by examiner

*Primary Examiner* — Scott J Sugarman
(74) *Attorney, Agent, or Firm* — Rossi, Kimms & McDowell LLP

(57) ABSTRACT

A zoom lens includes, in order from an object side to an image side: a first lens unit having positive refractive power, which does not move for zooming, the first lens unit including a lens unit which moves for focusing; a second lens unit having negative refractive power for magnification variation; a third lens unit having negative refractive power, which moves for zooming; a fourth lens unit having positive refractive power, which moves for zooming; and a fifth lens unit having positive refractive power, which does not move for zooming, in which an interval between the fourth lens unit and the fifth lens unit becomes largest at a telephoto end, and lateral magnifications β2w and β2t of the second lens unit at a wide-angle end and at the telephoto end are respectively set appropriately.

5 Claims, 14 Drawing Sheets

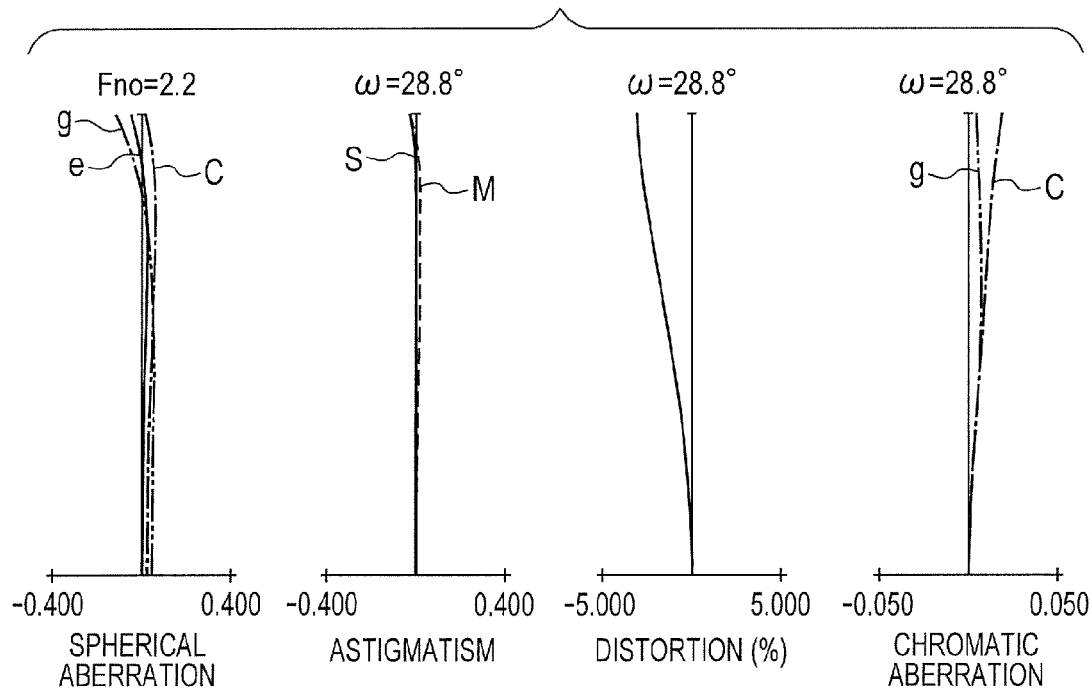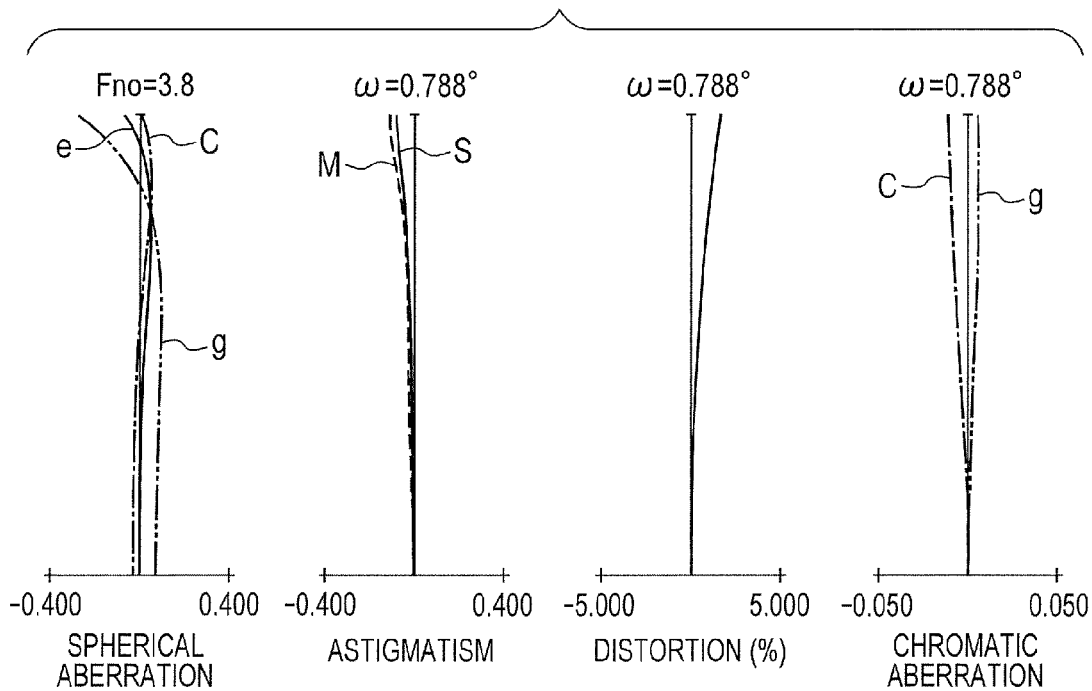

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting camera, a video camera, a digital still camera, a monitoring camera, and a silver-halide film camera, for example.

2. Description of the Related Art

In recent years, a zoom lens having a wide angle of field, a high zoom ratio, and high optical performance is required for an image pickup apparatus such as a television camera, a silver-halide film camera, a digital camera, or a video camera. As a zoom lens having a wide angle of field and a high zoom ratio, there is known a positive-lead five-unit zoom lens constituted of five lens units including a positive lens unit disposed closest to an object side. As this positive-lead zoom lens, there is known a five-unit zoom lens for a television camera, in which a magnification-varying lens unit (magnification varying unit) having functions as a variator and a compensator is constituted of three movable lens units, which move along different loci from each other.

For instance, there is known a five-unit zoom lens that is suitable for a television camera, which includes a first lens unit having positive refractive power, a second lens unit having negative refractive power, a third lens unit having negative refractive power, a fourth lens unit having positive refractive power, and a fifth lens unit having positive refractive power (Japanese Patent Application Laid-Open Nos. H02-050120 and H04-147110). In this five-unit zoom lens, the magnification varying unit which is constituted of three movable lens units including the second lens unit having negative refractive power, the third lens unit having negative refractive power, and the fourth lens unit having positive refractive power performs magnification variation and correction of image plane variation due to the magnification variation.

In order to obtain high optical performance while maintaining a higher zoom ratio in the five-unit zoom lens, it is important to appropriately set moving conditions of the second, third, and fourth lens units as magnification-varying lens units for zooming, a refractive power of the second and fourth lens units, and the like. Other than that, it is also important to set appropriately imaging magnifications of the second lens unit at a wide-angle end and at a telephoto end. If these structures are not appropriately set, it is difficult to provide a zoom lens having a wide angle of field, a high zoom ratio, and high optical performance over the entire zoom range.

The five-unit zoom lenses described in Japanese Patent Application Laid-Open Nos. H02-050120 and H04-147110 each realize a smaller size of the entire system and higher performance, but have a small magnification-varying ratio of the second lens unit in zooming from the wide-angle end to the telephoto end, with the result that the zoom ratio is not always sufficient.

SUMMARY OF THE INVENTION

The present invention provides a zoom lens having a high zoom ratio and high optical performance over the entire zoom range, and to provide an image pickup apparatus including the zoom lens.

According to an exemplary embodiment of the present invention, there is provided a zoom lens including, in order from an object side to an image side: a first lens unit having positive refractive power, which does not move for zooming, the first lens unit including a lens unit which moves for focusing; a second lens unit having negative refractive power for magnification variation; a third lens unit having negative refractive power, which moves for zooming; a fourth lens unit having positive refractive power, which moves for zooming; and a fifth lens unit having positive refractive power, which does not move for zooming, in which an interval between the fourth lens unit and the fifth lens unit becomes largest at a telephoto end in zooming, and the following expressions are satisfied:

$$0.19 < |\beta 2w| < 0.42; \text{ and}$$

$$10.0 < |\beta 2t/\beta 2w|,$$

where $\beta 2w$ and $\beta 2t$ represent lateral magnifications of the second lens unit at a wide-angle end and at the telephoto end, respectively.

According to the present invention, it is possible to obtain the zoom lens having a high zoom ratio and high optical performance over the entire zoom range.

Further features of the present invention will become apparent from the following description of exemplary embodiments with reference to the attached drawings.

BRIEF DESCRIPTION OF THE DRAWINGS

FIG. 4A is an aberration diagram at the wide-angle end according to Numerical Embodiment 2.

FIG. 4B is an aberration diagram at the telephoto end according to Numerical Embodiment 2.

DESCRIPTION OF THE EMBODIMENTS

Embodiments of a zoom lens and an image pickup apparatus including the zoom lens according to the present invention is hereinafter described. The zoom lens of the present invention includes, in order from an object side to an image side, a first lens unit having positive refractive power, which does not move for zooming, the first lens unit including a lens unit which moves for focusing, a second lens unit having negative refractive power for magnification variation, and a third lens unit having negative refractive power, which performs at least one of the magnification variation and correction of an image plane variation due to the magnification variation.

The zoom lens further includes a fourth lens unit having positive refractive power, which performs at least one of the magnification variation and the correction of the image plane variation due to the magnification variation, and a fifth lens unit having positive refractive power, which does not move for zooming. In zooming from the wide-angle end to the telephoto end, the second lens unit moves from the object side to the image side, the third lens unit moves along a locus convex toward the object side, and the fourth lens unit moves from the image side to the object side. Focusing is performed by moving a part or a whole of the first lens unit. Here, "a lens does not move for zooming" means that the lens does not move for a purpose of zooming but may move in the focusing process, for example.

Figure 1A:
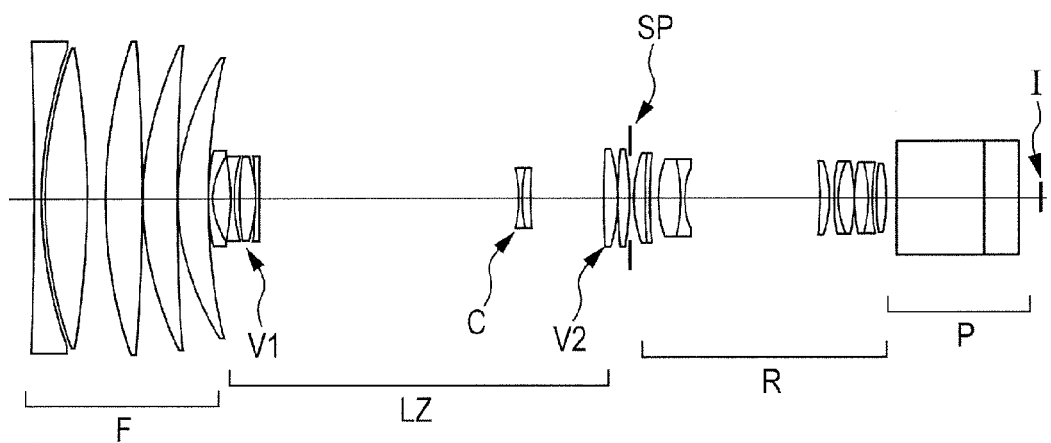
FIG. 1A is a lens cross-sectional view at a wide-angle end according to Numerical Embodiment 1.
Figure 1B:
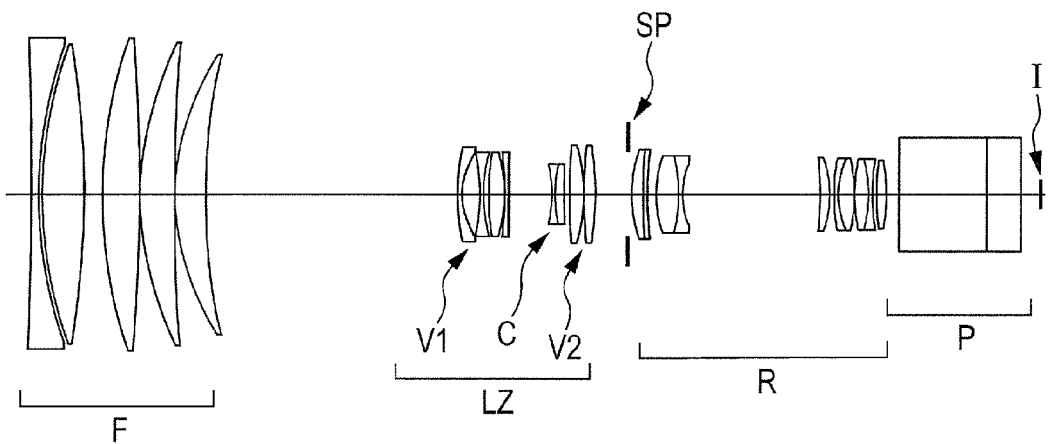
FIG. 1B is a lens cross-sectional view at a telephoto end according to Numerical Embodiment 1.
Figure 2A:
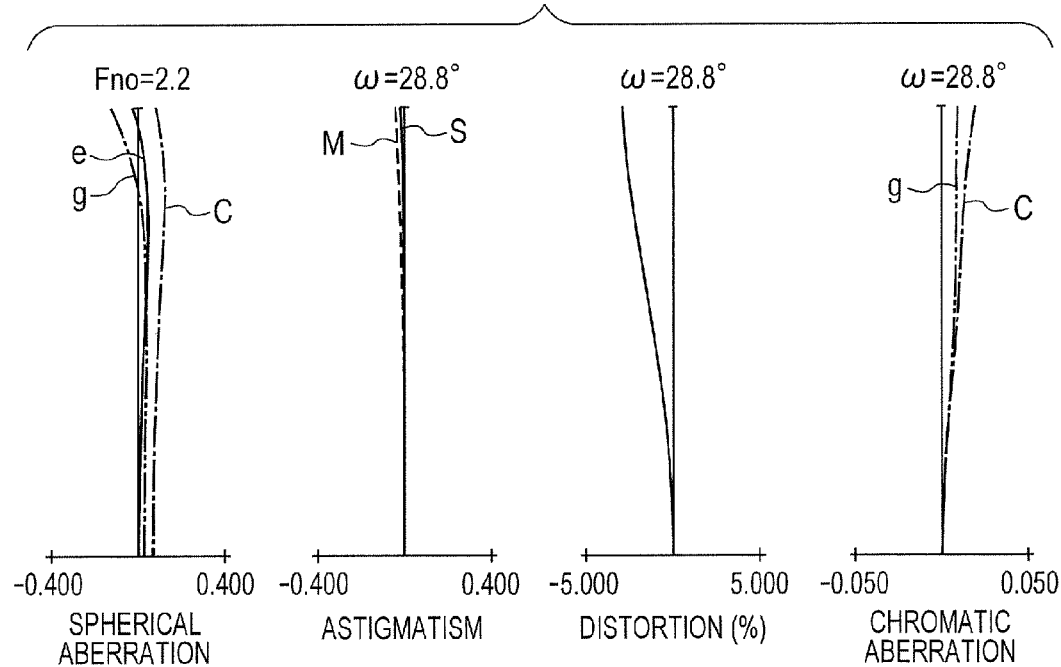
FIG. 2A is an aberration diagram at the wide-angle end according to Numerical Embodiment 1.
Figure 2B:
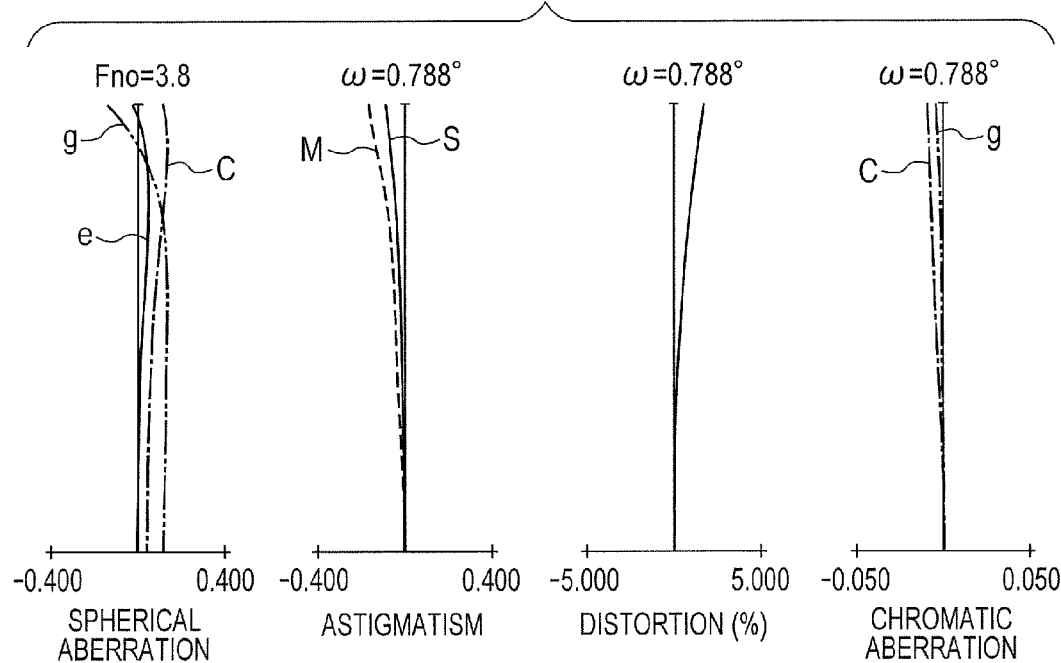
FIG. 2B is an aberration diagram at the telephoto end according to Numerical Embodiment 1.

FIGS. 1A and 1B are lens cross-sectional views respectively at the wide-angle end (shortest focal length end) and at the telephoto end (longest focal length end) of the zoom lens according to Embodiment 1 of the present invention. FIGS. 2A and 2B are aberration diagrams respectively at the wide-angle end and at the telephoto end of the zoom lens according to Embodiment 1. The zoom lens according to Embodiment 1 has a high zoom ratio and a large aperture, that is, a zoom ratio of 40.0 and an F-number of 2.20 at the wide-angle end.

Figure 3A:
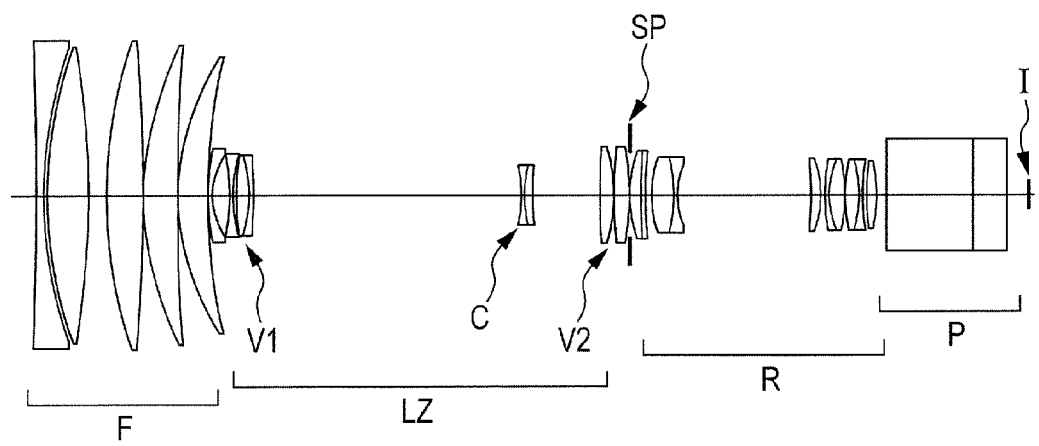
FIG. 3A is a lens cross-sectional view at a wide-angle end according to Numerical Embodiment 2.
Figure 3B:
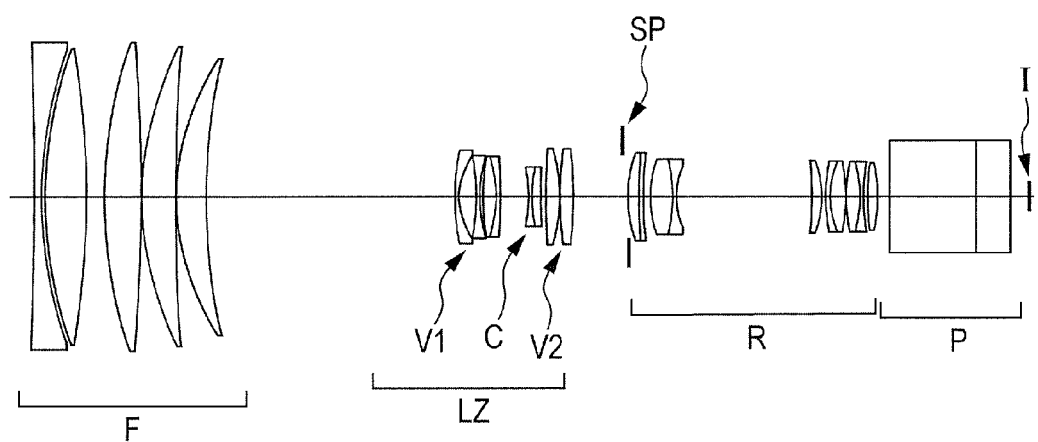
FIG. 3B is a lens cross-sectional view at a telephoto end according to Numerical Embodiment 2.

FIGS. 3A and 3B are lens cross-sectional views respectively at the wide-angle end and at the telephoto end of the zoom lens according to Embodiment 2 of the present invention. FIGS. 4A and 4B are aberration diagrams respectively at the wide-angle end and at the telephoto end of the zoom lens according to Embodiment 2 of the present invention. The zoom lens according to Embodiment 2 has a high zoom ratio and a large aperture, that is, a zoom ratio of 40.0 and an F-number of 2.20 at the wide-angle end.

Figure 5A:
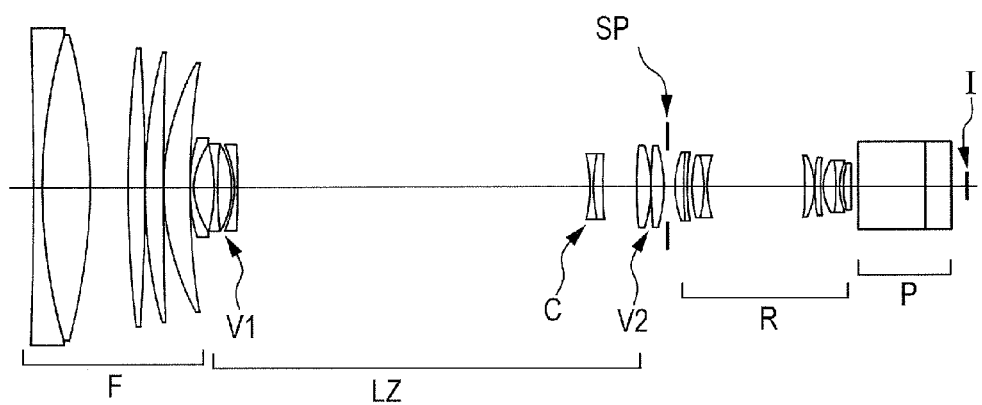
FIG. 5A is a lens cross-sectional view at a wide-angle end according to Numerical Embodiment 3.
Figure 5B:
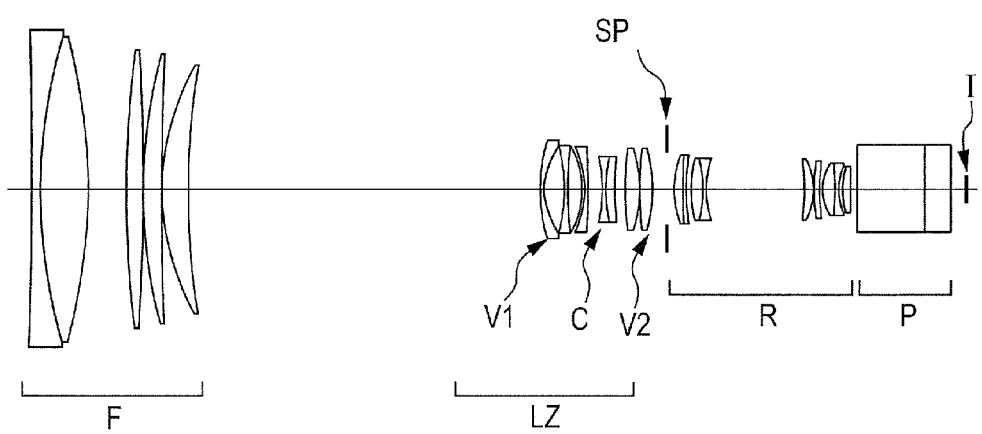
FIG. 5B is a lens cross-sectional view at a telephoto end according to Numerical Embodiment 3.
Figure 6A:
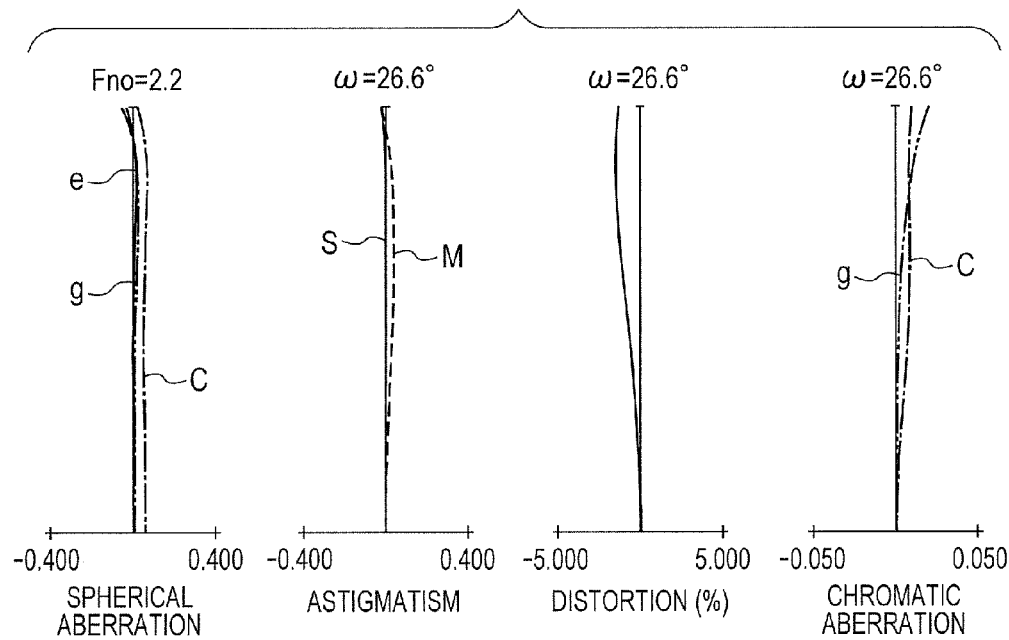
FIG. 6A is an aberration diagram at the wide-angle end according to Numerical Embodiment 3.
Figure 6B:
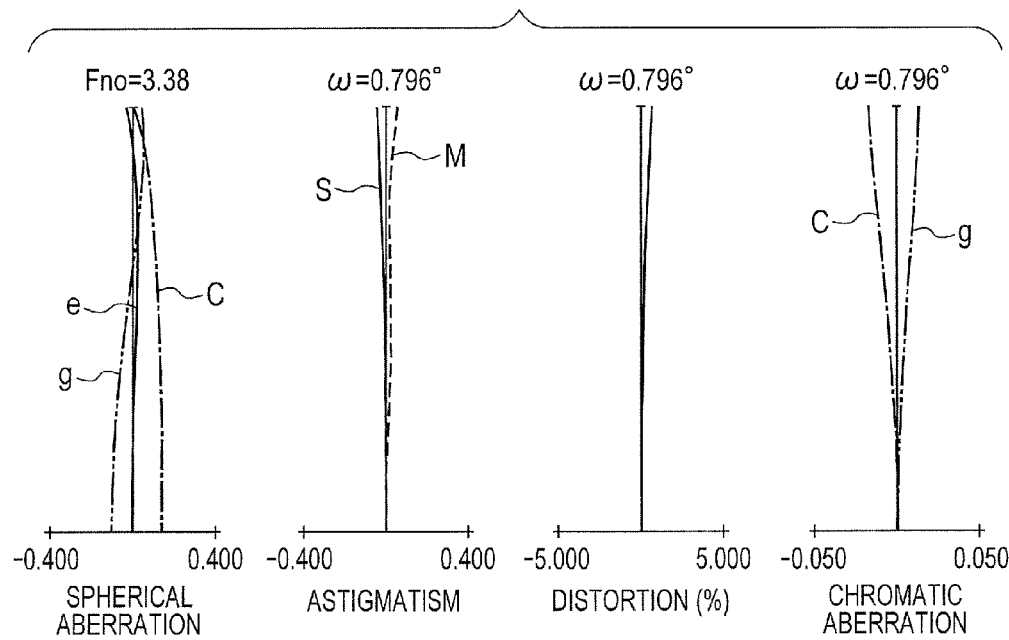
FIG. 6B is an aberration diagram at the telephoto end according to Numerical Embodiment 3.

FIGS. 5A and 5B are lens cross-sectional views respectively at the wide-angle end and at the telephoto end of the zoom lens according to Embodiment 3 of the present invention. FIGS. 6A and 6B are aberration diagrams respectively at the wide-angle end and at the telephoto end of the zoom lens according to Embodiment 3 of the present invention. The zoom lens according to Embodiment 3 has a high zoom ratio and a large aperture, that is, a zoom ratio of 36.0 and an F-number of 2.20 at the wide-angle end.

Figure 7A:
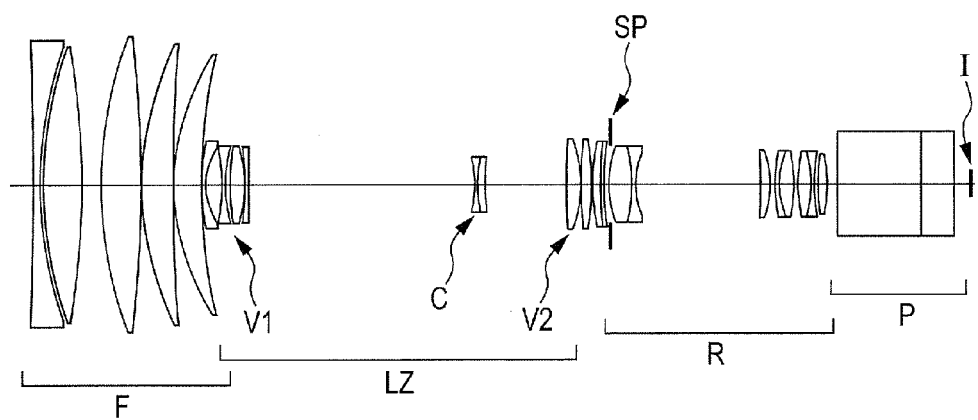
FIG. 7A is a lens cross-sectional view at a wide-angle end according to Numerical Embodiment 4.
Figure 7B:
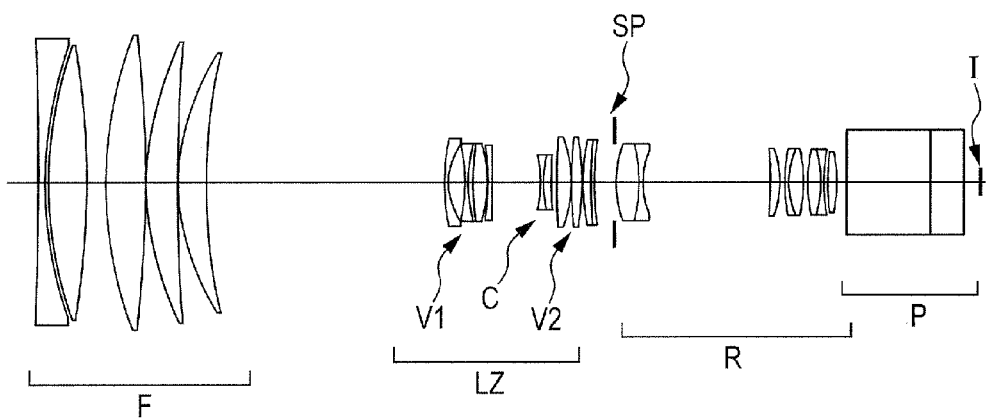
FIG. 7B is a lens cross-sectional view at a telephoto end according to Numerical Embodiment 4.
Figure 8A:
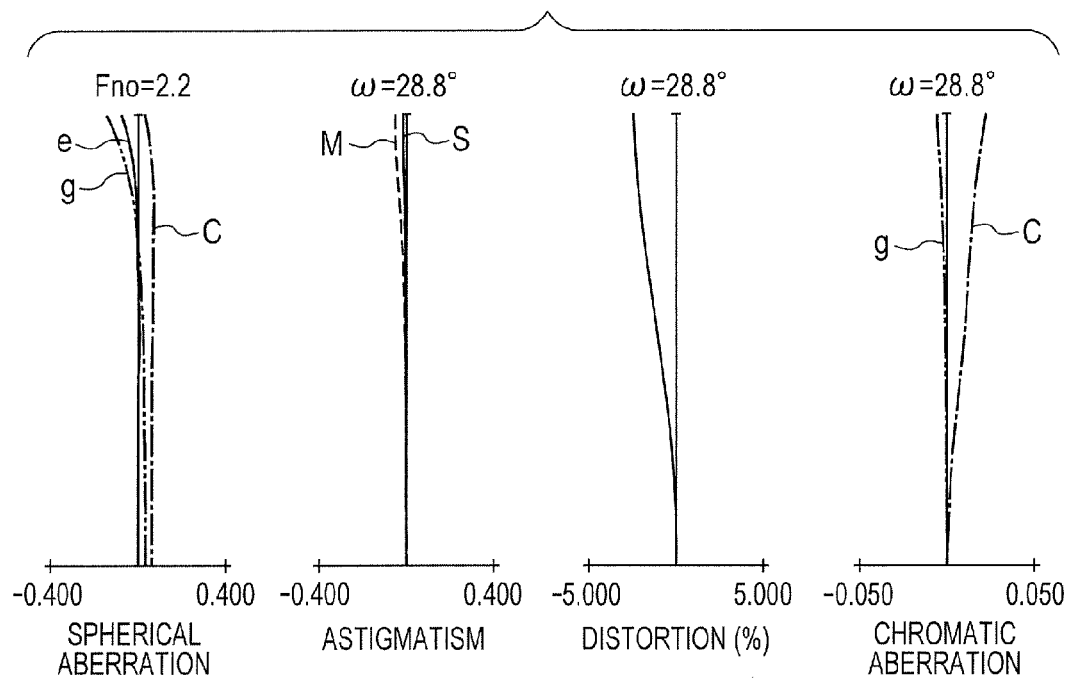
FIG. 8A is an aberration diagram at the wide-angle end according to Numerical Embodiment 4.
Figure 8B:
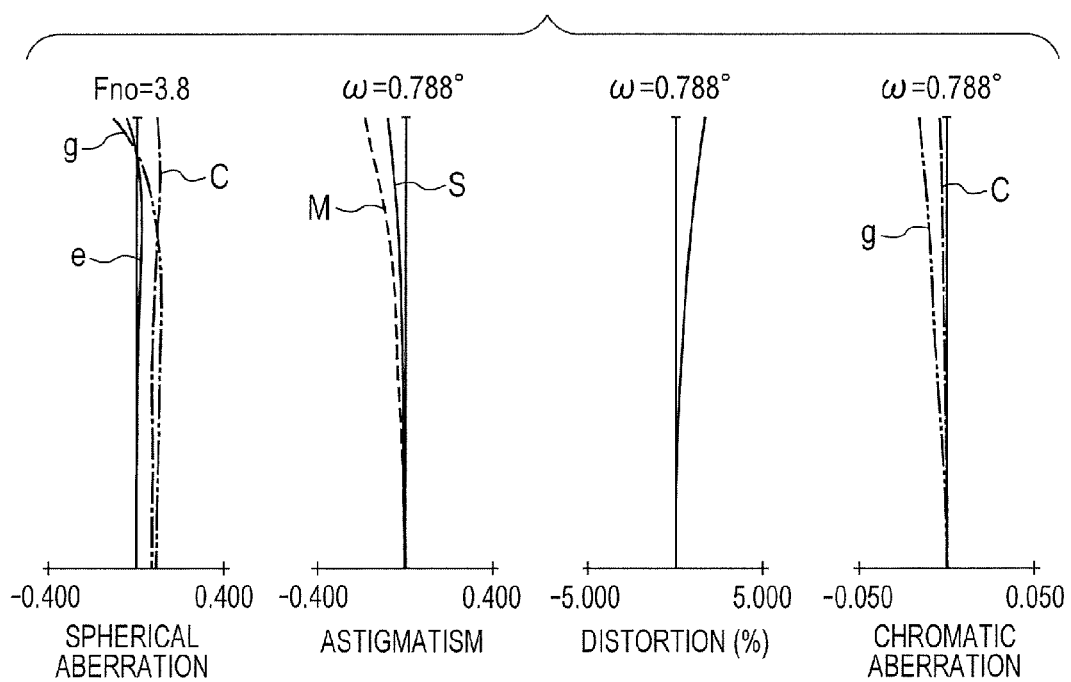
FIG. 8B is an aberration diagram at the telephoto end according to Numerical Embodiment 4.

FIGS. 7A and 7B are lens cross-sectional views respectively at the wide-angle end and at the telephoto end of the zoom lens according to Embodiment 4 of the present invention. FIGS. 8A and 8B are aberration diagrams respectively at the wide-angle end and at the telephoto end of the zoom lens according to Embodiment 4 of the present invention. The zoom lens according to Embodiment 4 has a high zoom ratio and a large aperture, that is, a zoom ratio of 40.0 and an F-number of 2.20 at the wide-angle end.

Figure 9A:
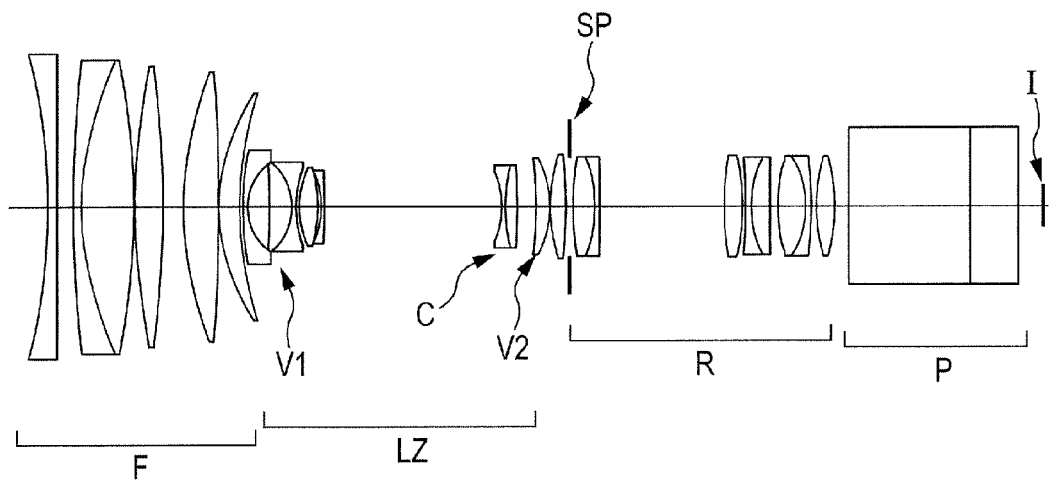
FIG. 9A is a lens cross-sectional view at a wide-angle end according to Numerical Embodiment 5.
Figure 9B:
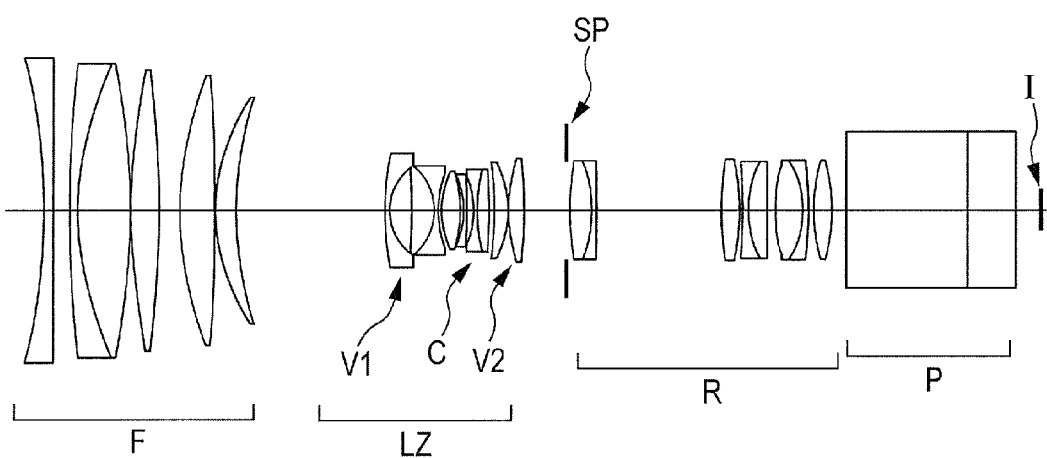
FIG. 9B is a lens cross-sectional view at a telephoto end according to Numerical Embodiment 5.
Figure 10A:
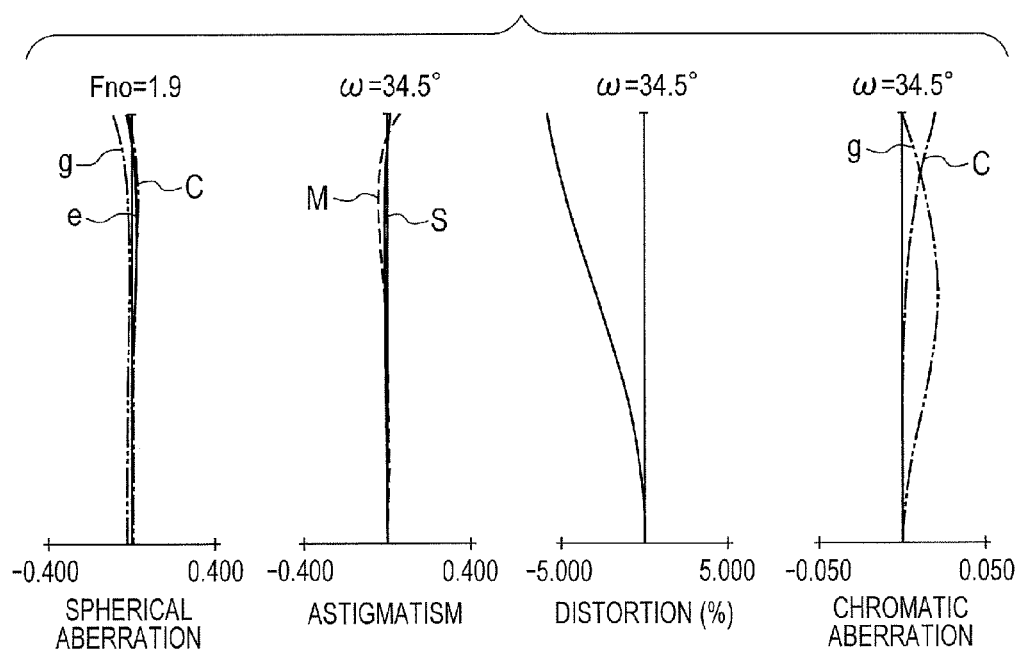
FIG. 10A is an aberration diagram at the wide-angle end according to Numerical Embodiment 5.
Figure 10B:
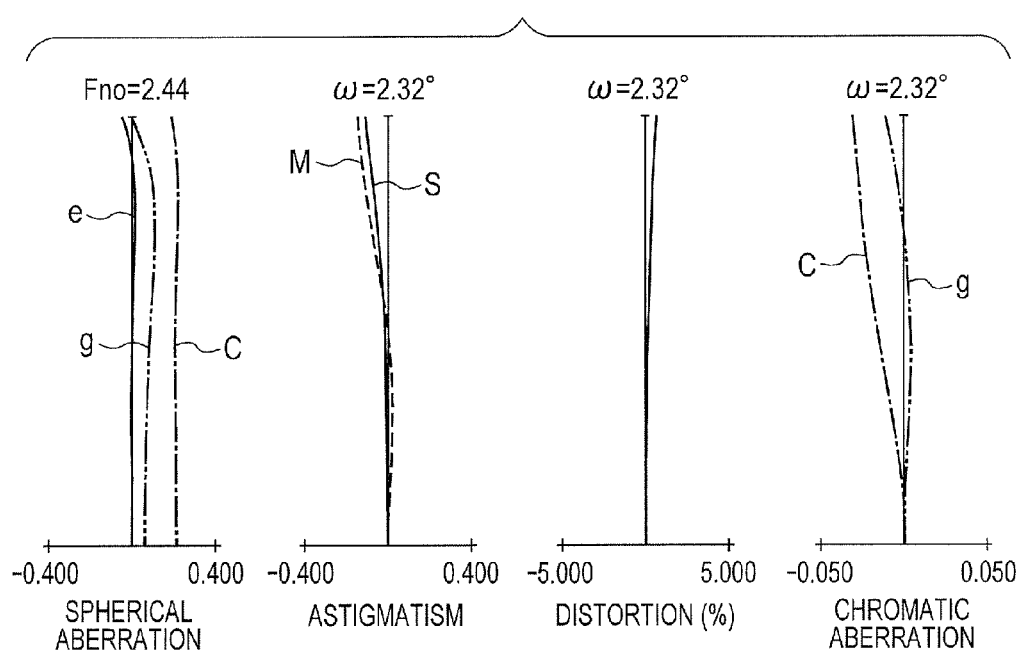
FIG. 10B is an aberration diagram at the telephoto end according to Numerical Embodiment 5.

FIGS. 9A and 9B are lens cross-sectional views respectively at the wide-angle end and at the telephoto end of the zoom lens according to Embodiment 5 of the present invention. FIGS. 10A and 10B are aberration diagrams respectively at the wide-angle end and at the telephoto end of the zoom lens according to Embodiment 5 of the present invention. The zoom lens according to Embodiment 5 has a high zoom ratio and a large aperture, that is, a zoom ratio of 17.0 and an F-number of 1.90 at the wide-angle end.

Figure 11A:
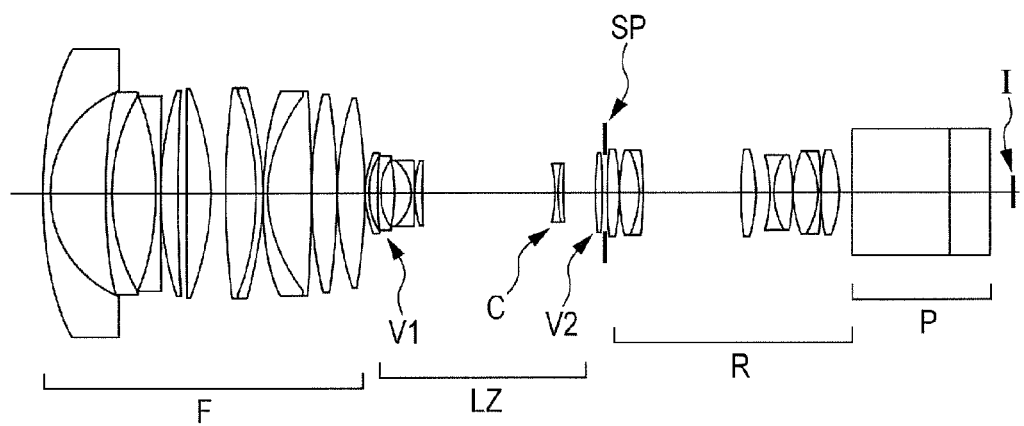
FIG. 11A is a lens cross-sectional view at a wide-angle end according to Numerical Embodiment 6.
Figure 11B:
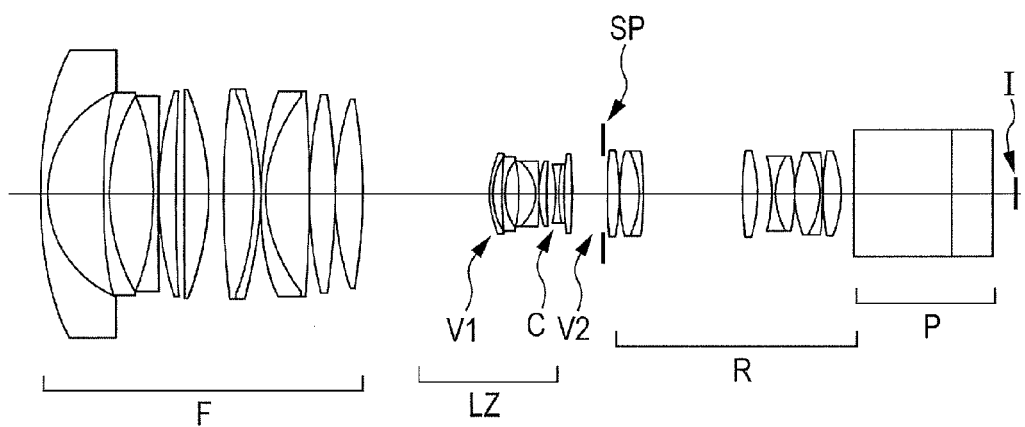
FIG. 11B is a lens cross-sectional view at a telephoto end according to Numerical Embodiment 6.
Figure 12A:
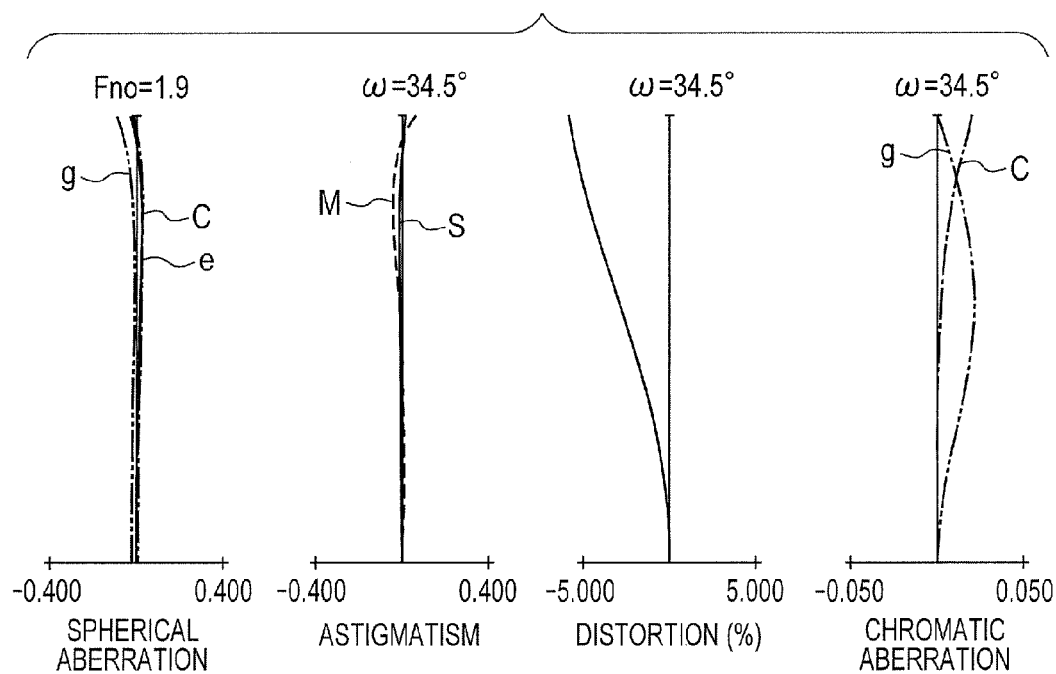
FIG. 12A is an aberration diagram at the wide-angle end according to Numerical Embodiment 6.
Figure 12B:
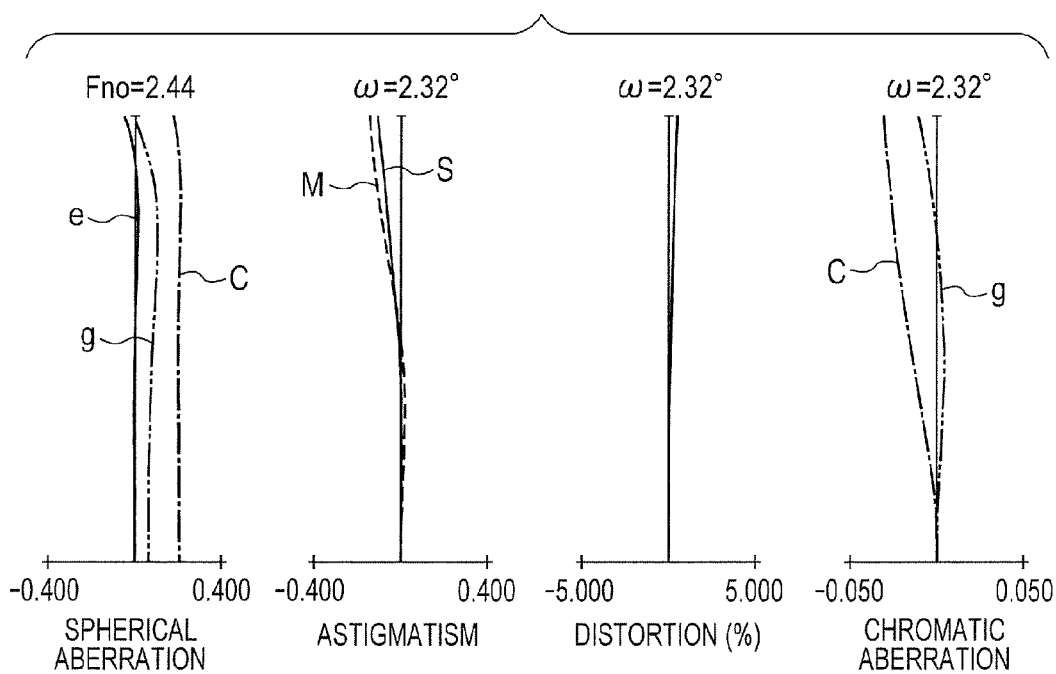
FIG. 12B is an aberration diagram at the telephoto end according to Numerical Embodiment 6.

FIGS. 11A and 11B are lens cross-sectional views respectively at the wide-angle end and at the telephoto end of the zoom lens according to Embodiment 6 of the present invention. FIGS. 12A and 12B are aberration diagrams respectively at the wide-angle end and at the telephoto end of the zoom lens according to Embodiment 6 of the present invention. The zoom lens according to Embodiment 6 has a high zoom ratio and a large aperture, that is, a zoom ratio of 9.0 and an F-number of 1.90 at the wide-angle end.

Figure 13A:
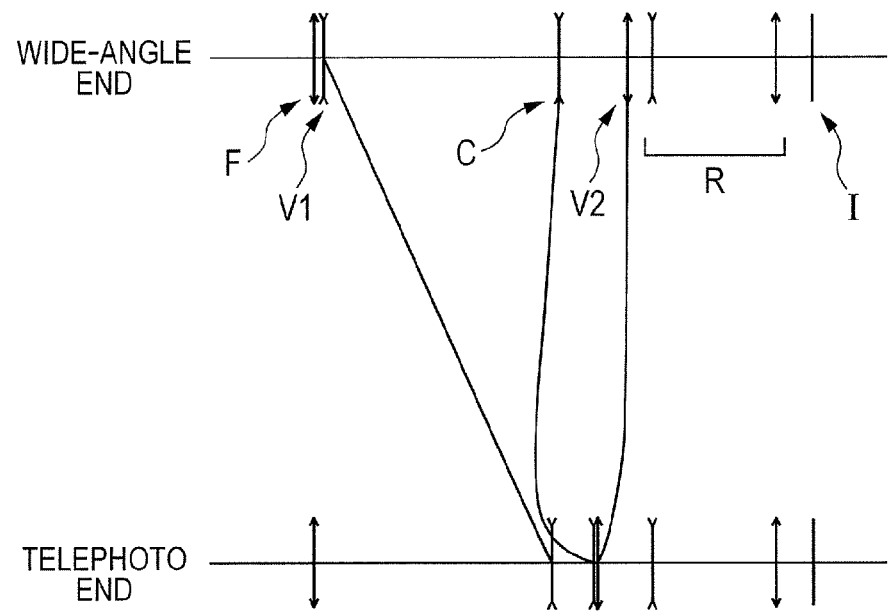
FIG. 13A is a schematic diagram illustrating moving loci of individual lens units of a zoom lens according to the present invention.
Figure 13B:
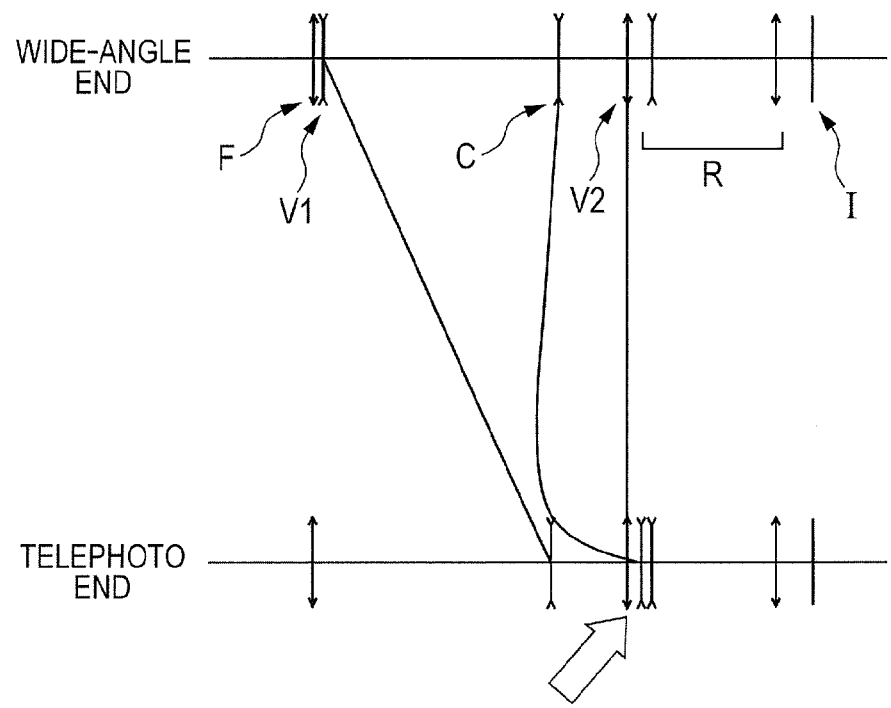
FIG. 13B is a schematic diagram illustrating moving loci of the individual lens units of the zoom lens according to the present invention (supposing that a fourth lens unit V2 does not move from an image side to an object side in zooming from the wide-angle end to the telephoto end).
Figure 14:
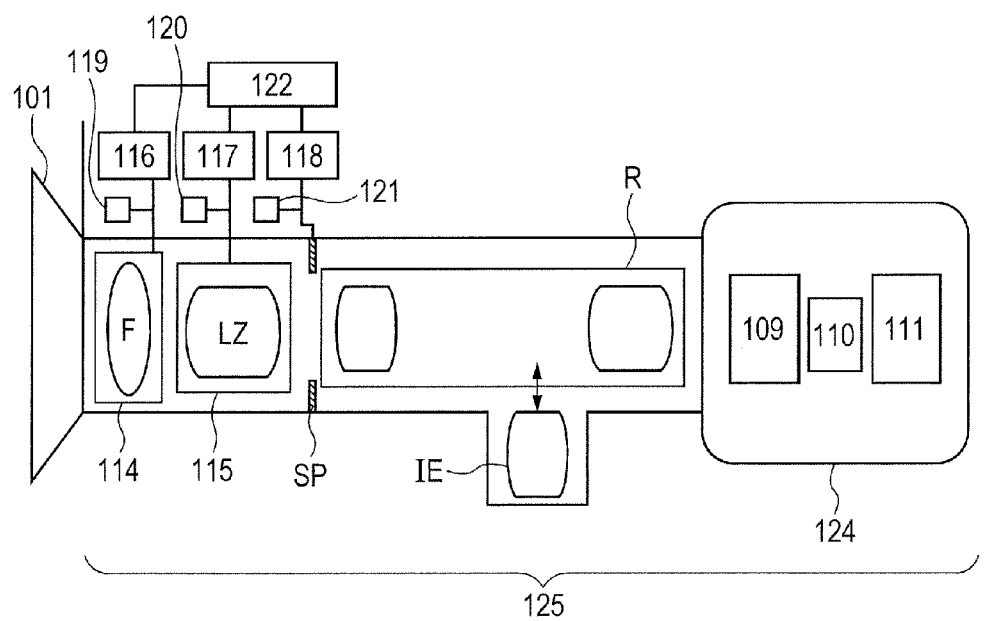
FIG. 14 is a schematic diagram of a main part of an image pickup apparatus of the present invention.

FIGS. 13A and 13B are schematic diagrams of moving loci of the individual lens units in the zoom lens of the present invention. FIG. 14 is a schematic diagram of a main part of a television camera (an image pickup apparatus) equipped with the zoom lens of the present invention. The zoom lens of each embodiment is a photographing lens system used for an image pickup apparatus. In the lens cross-sectional views, the left side corresponds to a subject side (front), and the right side corresponds to the image side (rear).

In the lens cross-sectional views, a front lens unit (first lens unit) F has positive refractive power, and includes a lens unit for focusing. A variator (second lens unit) V1 has negative refractive power for magnification variation, and is monotonously moved on the optical axis to the image plane side so as to perform the magnification variation from the wide-angle end to the telephoto end.

Further, a compensator (third lens unit) C has negative refractive power, and moves along a locus convex toward the object side for correcting the image plane variation due to the magnification variation or for magnification variation. A variator (fourth lens unit) V2 has positive refractive power, and moves for the magnification variation or for correction of the image plane variation due to the magnification variation. The fourth lens unit V2 moves on the optical axis from the image side to the object side in zooming from the wide-angle end to the telephoto end. The second lens unit V1, the third lens unit C, and the fourth lens unit V2 constitute a magnification varying unit LZ.

A stop (an aperture stop) SP is disposed on the image side of the fourth lens unit V2. A relay lens unit (fifth lens unit) R has positive refractive power for imaging action, and does not move for zooming. P represents a color separation prism, an optical filter, or the like, and is illustrated as a glass block in the cross-sectional views. An image plane I corresponds to an image pickup plane of a solid-state image pickup element (photoelectric transducer) such as a CCD sensor or a CMOS sensor when using the zoom lens as a photographing optical system of a video camera or a digital still camera.

Note that, zoom positions at the wide-angle end and at the telephoto end in the following embodiments mean zoom positions at which the magnification-varying lens units (the second and fourth lens units V1 and V2 in the embodiments) are positioned at each end of a mechanically movable range on the optical axis.

Focusing is performed by a part or a whole of the first lens unit F. In spherical aberration diagrams, e, g, and C represent an e-line, a g-line, and a C-line, respectively. In astigmatism diagrams, M and S represent a meridional image plane and a sagittal image plane, respectively. A lateral chromatic aberration is illustrated by the g-line and the C-line. Fno represents denotes an F-number, and ω represents a half angle of field (degrees). In each embodiment, in zooming, the fourth lens unit V2 moves so that an interval between the fourth lens unit V2 and the fifth lens unit R becomes largest at the telephoto end.

The following conditional expressions are satisfied, $$0.19 < |\beta 2w| < 0.42 \quad (1)$$

$$10.0 < |\beta 2t/\beta 2w| \quad (2)$$

where β2w and β2t represent lateral magnifications of the second lens unit L2 at the wide-angle end and at the telephoto end, respectively.

In each embodiment, the second lens unit V1 and the fourth lens unit V2 are used for magnification variation. The second lens unit V1 has negative refractive power, and the fourth lens unit V2 has positive refractive power. Further, a lateral magnification β2w of the second lens unit V1 at the wide-angle end and a magnification-varying ratio β2t/β2w between the telephoto end and the wide-angle end are set to appropriate values. Thus, a higher zoom ratio is realized while decreasing a movement amount of the second lens unit V1 in zooming.

In addition, the fourth lens unit V2 is monotonously moved toward the object side from the wide-angle end to the telephoto end for performing the magnification variation. Thus, a movement amount of the third lens unit C for correction of the image plane variation at the telephoto side is reduced. In this way, downsizing of the entire system and a higher zoom ratio are realized. In each embodiment, by adopting the above-mentioned structure, it is possible to provide a compact zoom lens having a high zoom ratio and a large aperture while achieving good optical performance.

Next, a moving condition of each lens unit in zooming in each embodiment is described.

FIG. 13A is a schematic diagram of moving loci of the lens units of the zoom lens according to the present invention. FIG. 13B is a schematic diagram of moving loci of the lens units of the five-unit zoom lens constituted of lens units having the same refractive power as that of the present invention, supposing that the fourth lens unit V2 does not move from the image side to the object side in zooming from the wide-angle end to the telephoto end.

In the case where the fourth lens unit V2 does not move in zooming, at the telephoto side as illustrated in FIG. 13B, the movement amount of the third lens unit C for correcting the image plane variation generated due to the magnification variation is increased. As a result, the third lens unit C and the fourth lens unit V2 interfere with each other at the telephoto end. In order to avoid this interference, it is necessary to secure a large interval between the third lens unit C and the fourth lens unit V2 in advance. As a result, the entire length of the zoom lens is increased, and hence it becomes difficult to realize a smaller size of the entire system.

In contrast, in the case where the fourth lens unit V2 moves in zooming, on the telephoto side as illustrated in FIG. 13A, the movement amount of the third lens unit C to the image side for correcting the image plane variation generated due to the magnification variation is reduced. Therefore, it is possible to reduce an increase of the entire length of the lens caused by the movement amount of the third lens unit C. Thus, it becomes easy to realize a small size of the entire system.

The conditional expressions (1) and (2) are set in consideration of the above-mentioned matter. The conditional expression (1) defines the lateral magnification at the wide-angle end of the second lens unit V1. By increasing the lateral magnification at the wide-angle end of the second lens unit V1, the movement amount of the second lens unit V1 in zooming is decreased while a higher zoom ratio is realized. If the lateral magnification is below the lower limit of the conditional expression (1), the movement amount of the second lens unit V1 in zooming is increased, and hence it becomes difficult to realize a higher zoom ratio and a smaller size of the entire system. If the lateral magnification exceeds the upper limit of the conditional expression (1), it becomes difficult for the third lens unit C to correct the image plane variation generated due to the magnification variation at the telephoto side.

In addition, the movement amount of the third lens unit C for correcting the image plane variation on the telephoto side is increased, and hence it becomes difficult to realize a smaller size the entire system. Further, incident height of an axial ray to the second lens unit V1 is decreased at the telephoto end, and hence it becomes difficult to correct the axial chromatic aberration at the telephoto end.

The conditional expression (2) defines a ratio between the lateral magnification at the wide-angle end and the lateral magnification at the telephoto end of the second lens unit V1. By setting the magnification-varying ratio between the telephoto end and the wide-angle end of the second lens unit V1 to an appropriate value, the movement amount of the second lens unit V1 in zooming is decreased while a higher zoom ratio is realized. If the ratio is below the lower limit of the conditional expression (2), the magnification-varying ratio of the second lens unit V1 is decreased, and hence it becomes difficult to realize a higher zoom ratio. In order to achieve a higher zoom ratio, it is necessary to increase the magnification-varying ratio of another magnification-varying lens unit (the fourth lens unit V2). Then, because the movement amount of the fourth lens unit V2 in zooming is increased, it becomes difficult to realize a higher zoom ratio and a smaller size of the entire system.

In each embodiment, an air interval between the fourth lens unit V2 and the fifth lens unit R at the telephoto end is set to be largest in zooming. In particular, the moving locus of the fourth lens unit V2 in zooming is defined, and the magnification-varying ratio of the fourth lens unit V2 is set to an appropriate value. Thus, a higher zoom ratio and a smaller size of the entire system are realized. It is more preferred to set the numerical value ranges of the conditional expressions (1) and (2) as follows.

$$0.2 < |\beta 2w| < 0.4 \quad (1a)$$

$$10.5 < |\beta 2t/\beta 2w| < 3000 \quad (2a)$$

Here, the upper limit value (3000) of the conditional expression (2a) may be used as the upper limit value of the conditional expression (2).

By satisfying the above-mentioned conditions, it is possible to obtain the zoom lens having a high zoom ratio and high optical performance over the entire zoom range. In each embodiment, in order to perform more appropriate aberration correction and to decrease aberration variation in zooming while realizing a smaller size of the entire lens system, one or more of the following conditions may be satisfied.

Focal lengths of the second lens unit V1 and the fourth lens unit V2 are represented by f2 and f4, respectively. Focal lengths of the zoom lens at the wide-angle end and at the telephoto end are represented by fw and ft, respectively. Intervals (air intervals) between the fourth lens unit V2 and the fifth lens unit R at the wide-angle end and at the telephoto end are represented by WL4 and TL4, respectively. In addition, a zoom ratio of the entire optical system is represented by βall. Note that, the zoom ratio as used herein is a value obtained by dividing the focal length at the telephoto end by the focal length at the wide-angle end. In this case, one or more of the following conditions may be satisfied.

$$1.4<|f2/fw|<4.0 \tag{3}$$

$$3.3<|f4/fw|<50.0 \tag{4}$$

$$1.5<TL4/WL4<120.0 \tag{5}$$

$$1.10<|\beta2t/\beta2w|/\beta all<100.0 \tag{6}$$

The conditional expression (3) defines a ratio of the focal lengths of the second lens unit V1 and the focal lengths of the entire system at the wide-angle end. If the ratio is below the lower limit of the conditional expression (3), variations of various aberrations in zooming are increased along with an increase of refractive power of the second lens unit V1. As a result, it becomes difficult to achieve high optical performance over the entire zoom range. If the ratio exceeds the upper limit of the conditional expression (3), refractive power of the second lens unit V1 is decreased, and the movement amount of the second lens unit V1 in zooming is increased. Therefore, it becomes difficult to realize a smaller size of the entire system.

The conditional expression (4) defines a ratio of the focal lengths of the fourth lens unit V2 and the focal lengths of the entire system at the wide-angle end. If the ratio is below the lower limit of the conditional expression (4), variations of various aberrations in zooming are increased along with an increase of refractive power of the fourth lens unit V2. As a result, it becomes difficult to achieve high optical performance over the entire zoom range. If the ratio exceeds the upper limit of the conditional expression (4), refractive power of the fourth lens unit V2 is decreased, and the movement amount of the fourth lens unit V2 in zooming is increased. Therefore, it becomes difficult to realize a smaller size of the entire system.

The conditional expression (5) defines a ratio of the air interval from the fourth lens unit V2 to the fifth lens unit R at the wide-angle end and the air interval at the telephoto end. If the ratio is below the lower limit of the conditional expression (5), the movement amount of the fourth lens unit V2 in zooming is decreased. Then, it becomes difficult to appropriately set the magnification-varying ratio of the fourth lens unit V2, and hence it becomes difficult to realize a higher zoom ratio. If the ratio exceeds the upper limit of the conditional expression (5), the movement amount of the fourth lens unit V2 in zooming is increased. Therefore, the entire lens length is increased, and hence it becomes difficult to realize a smaller size of the entire system. In addition, aberration variation in zooming along with an increase of the movement amount of the fourth lens unit V2 is increased, and hence it becomes difficult to achieve high optical performance over the entire zoom range.

In addition, the conditional expression (6) is a conditional expression defining a ratio of magnification of the second lens unit in the zoom ratio of the entire zoom lens. If the ratio is below the lower limit of this conditional expression, the magnification-varying ratio (zoom ratio) of the second lens unit is decreased, and hence it becomes difficult to realize a higher zoom ratio. In addition, if the ratio exceeds the upper limit of this conditional expression, the magnification-varying ratio of the second lens unit becomes too large. Therefore, the aberration variation due to the movement of the second lens unit in the magnification variation becomes too large, which is not preferred. It is more preferred to set the numerical value ranges of the conditional expressions (3) to (6) as follows.

$$1.50<|f2/fw|<3.85 \tag{3a}$$

$$3.4<|f4/fw|<45.0 \tag{4a}$$

$$1.7<TL4/WL4<110.0 \tag{5a}$$

$$2.40<|\beta2t/\beta2w|/\beta all<72.0 \tag{6a}$$

Here, the upper limit value (72.0) of the conditional expression (6a) may be used as the upper limit value of the conditional expression (6).

As described above, according to each embodiment, by constituting the magnification-varying lens unit of the three movable lens units, it is possible to provide the zoom lens in which a smaller size of the entire system and a higher zoom ratio are realized, and to provide the image pickup apparatus including the zoom lens.

Next, a lens structure in each embodiment is described. It is hereinafter supposed that the individual lenses are disposed in order from the object side to the image side. The first lens unit F is constituted of a negative lens and four positive lenses. Alternatively, the first lens unit F is constituted of a negative lens, a cemented lens in which a negative lens and a positive lens are cemented, and three positive lenses. Alternatively, the first lens unit F is constituted of three negative lenses, two positive lenses, a cemented lens in which a positive lens and a negative lens are cemented, a cemented lens in which a negative lens and a positive lens are cemented, and two positive lenses.

The second lens unit V1 is constituted of two negative lenses, a positive lens, and a negative lens. Alternatively, the second lens unit V1 is constituted of a negative lens, a cemented lens in which a positive lens and a negative lens are cemented, a positive lens, and a negative lens. Alternatively, the second lens unit V1 is constituted of two negative lenses, a cemented lens in which a positive lens and a negative lens are cemented, and a positive lens. The third lens unit C is constituted of a cemented lens in which a negative lens and a positive lens are cemented. The fourth lens unit V2 is constituted of one positive lens. Alternatively, the fourth lens unit V2 is constituted of two positive lenses. Alternatively, the fourth lens unit V2 is constituted of two positive lenses and a cemented lens in which a positive lens and a negative lens are cemented. The fifth lens unit R includes a positive lens and a negative lens, and is constituted of eight to ten lenses as a whole.

Numerical Embodiments 1 to 6, corresponding to Embodiments 1 to 6 of the present invention, are hereinafter described. In each Numerical Embodiment, "i" represents the order of a surface from the object side, "ri" represents a radius of curvature of an i-th surface from the object side, "di" represents an interval between the i-th surface and the (i+1)th surface from the object side, and "ndi" and "υdi" respectively represent a refractive index and an Abbe number of the i-th optical material. The focal length, the F-number, and the angle of field respectively represent values obtained when focusing on an infinitely-distant object.

BF represents denotes a length from a final surface (final surface of the glass block) to the image plane. The final three surfaces are surfaces of a glass block such as a filter. The aspherical shape is expressed by the following expression:

$$X = \frac{(1/R)H^2}{1+\sqrt{1-(1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10}$$

where an X axis corresponds to the optical axis, an H axis corresponds to an axis perpendicular to the optical axis, a traveling direction of light corresponds to a positive direction, "R" represents a paraxial curvature radius, "K" represents a conic constant, and "A3" to "A10" each represent an aspherical coefficient.

Further, for example, "e-Z" means "×10$^{-Z}$". Table 1 shows a correspondence between the above-mentioned conditional expression and obtained values in each embodiment.

Numerical Embodiment 1

Unit: mm

Surface data

| Surface No. | r | d | nd | vd | Effective diameter |
|---|---|---|---|---|---|
| 1 | −1166.816 | 3.00 | 1.83481 | 42.7 | 110.06 |
| 2 | 166.342 | 0.83 | | | 107.06 |
| 3 | 170.369 | 15.49 | 1.43387 | 95.1 | 107.16 |
| 4 | −292.041 | 6.90 | | | 106.97 |
| 5 | 173.555 | 13.91 | 1.43387 | 95.1 | 111.07 |
| 6 | −514.293 | 0.20 | | | 110.95 |
| 7 | 126.682 | 12.64 | 1.43387 | 95.1 | 108.03 |
| 8 | 1169.451 | 0.20 | | | 107.30 |
| 9 | 93.913 | 10.85 | 1.43387 | 95.1 | 99.87 |
| 10 | 222.567 | (Variable) | | | 98.38 |
| 11 | 192.986 | 1.00 | 1.88300 | 40.8 | 33.55 |
| 12 | 27.675 | 6.82 | | | 29.34 |
| 13 | −47.818 | 0.90 | 1.81600 | 46.6 | 29.11 |
| 14 | 55.821 | 2.07 | | | 28.85 |
| 15 | 90.020 | 5.71 | 1.80809 | 22.8 | 29.34 |
| 16 | −46.847 | 0.28 | | | 29.44 |
| 17 | −66.470 | 1.10 | 1.81600 | 46.6 | 28.91 |
| 18 | −572.200 | (Variable) | | | 28.77 |
| 19 | −48.990 | 1.30 | 1.71700 | 47.9 | 19.35 |
| 20 | 41.188 | 3.00 | 1.84649 | 23.9 | 20.24 |
| 21 | 236.835 | (Variable) | | | 20.62 |
| 22 | 270.872 | 5.11 | 1.62041 | 60.3 | 33.58 |
| 23 | −53.865 | 0.10 | | | 34.01 |
| 24 | 205.650 | 4.22 | 1.51633 | 64.1 | 33.89 |
| 25 | −86.017 | (Variable) | | | 33.75 |
| 26 (Stop) | ∞ | 1.52 | | | 32.38 |
| 27 | 50.115 | 4.25 | 1.48749 | 70.2 | 31.04 |
| 28 | 475.071 | 1.30 | 1.63980 | 34.5 | 30.16 |
| 29 | 129.801 | 2.99 | | | 29.40 |
| 30 | 38.064 | 8.54 | 1.48749 | 70.2 | 27.00 |
| 31 | −44.223 | 1.50 | 1.88300 | 40.8 | 24.42 |
| 32 | 32.794 | 50.00 | | | 22.74 |
| 33 | −112.761 | 3.60 | 1.48749 | 70.2 | 25.29 |
| 34 | −34.148 | 2.00 | | | 25.70 |
| 35 | 100.011 | 1.20 | 1.78590 | 44.2 | 25.39 |
| 36 | 28.006 | 5.79 | 1.51742 | 52.4 | 24.92 |
| 37 | −77.193 | 0.26 | | | 24.92 |
| 38 | 54.367 | 5.43 | 1.51742 | 52.4 | 24.48 |
| 39 | −50.521 | 1.20 | 1.83481 | 42.7 | 23.79 |
| 40 | 63.496 | 1.60 | | | 23.30 |
| 41 | 86.922 | 4.01 | 1.48749 | 70.2 | 23.39 |
| 42 | −52.503 | 3.80 | | | 23.31 |
| 43 | ∞ | 33.00 | 1.60859 | 46.4 | 40.00 |
| 44 | ∞ | 13.20 | 1.51680 | 64.2 | 40.00 |
| 45 | ∞ | 7.88 | | | 40.00 |
| Image plane | ∞ | | | | |

Various data

| | | |
|---|---|---|
| Zoom ratio | 40.00 | |
| Focal length | 10.00 | 399.99 |
| F-number | 2.20 | 3.80 |
| Half angle of field | 28.81 | 0.79 |
| Image height | 5.50 | 5.50 |
| Entire lens length | 371.51 | 371.51 |
| BF | 7.88 | 7.88 |
| d10 | 0.63 | 91.94 |
| d18 | 94.99 | 16.82 |
| d21 | 27.08 | 1.96 |
| d25 | 0.10 | 12.08 |
| Incidence pupil position | 76.96 | 2079.09 |
| Exit pupil position | 164.15 | 164.15 |
| Front principal point position | 87.60 | 3502.92 |
| Rear principal point position | −2.12 | −392.11 |

Zoom lens unit data

| Unit | First surface | Focal length | Lens structure length | Front principal point position | Rear principal point position |
|---|---|---|---|---|---|
| 1 | 1 | 127.00 | 64.02 | 34.03 | −10.16 |
| 2 | 11 | −23.00 | 17.87 | 1.72 | −12.56 |
| 3 | 19 | −66.10 | 4.30 | 0.40 | −1.95 |
| 4 | 22 | 45.50 | 9.43 | 3.65 | −2.45 |
| 5 | 26 | 55.31 | 145.20 | 80.98 | −10.35 |

Single lens data

| Lens | First surface | Focal length |
|---|---|---|
| 1 | 1 | −173.25 |
| 2 | 3 | 249.91 |
| 3 | 5 | 300.18 |
| 4 | 7 | 325.44 |
| 5 | 9 | 364.21 |
| 6 | 11 | −36.48 |
| 7 | 13 | −31.28 |
| 8 | 15 | 38.46 |
| 9 | 17 | −91.79 |
| 10 | 19 | −30.87 |
| 11 | 20 | 57.92 |
| 12 | 22 | 72.57 |
| 13 | 24 | 117.61 |
| 14 | 27 | 114.16 |
| 15 | 28 | −277.65 |
| 16 | 30 | 43.30 |
| 17 | 31 | −21.01 |
| 18 | 33 | 98.65 |
| 19 | 35 | −49.60 |
| 20 | 36 | 40.30 |
| 21 | 38 | 51.29 |
| 22 | 39 | −33.36 |
| 23 | 41 | 67.55 |
| 24 | 43 | 0.00 |
| 25 | 44 | 0.00 |

Numerical Embodiment 2

Unit: mm

Surface data

| Surface No. | r | d | nd | vd | Effective diameter |
|---|---|---|---|---|---|
| 1 | −1060.599 | 3.00 | 1.83481 | 42.7 | 109.24 |
| 2 | 159.610 | 0.87 | | | 106.22 |
| 3 | 162.914 | 15.24 | 1.43387 | 95.1 | 106.47 |
| 4 | −317.432 | 6.94 | | | 106.94 |
| 5 | 175.147 | 14.72 | 1.43387 | 95.1 | 111.83 |
| 6 | −405.326 | 0.20 | | | 111.76 |
| 7 | 132.722 | 12.06 | 1.43387 | 95.1 | 108.85 |
| 8 | 1140.133 | 0.20 | | | 108.18 |
| 9 | 92.964 | 11.22 | 1.43387 | 95.1 | 100.87 |
| 10 | 240.585 | (Variable) | | | 99.70 |
| 11 | 172.793 | 1.00 | 1.88300 | 40.8 | 34.62 |
| 12 | 29.358 | 6.03 | | | 30.42 |
| 13 | −69.746 | 0.90 | 1.81600 | 46.6 | 30.34 |
| 14 | 45.327 | 1.21 | | | 29.47 |
| 15 | 68.856 | 5.41 | 1.80809 | 22.8 | 29.56 |
| 16 | −49.290 | 0.19 | | | 29.47 |
| 17 | −48.523 | 1.10 | 1.81600 | 46.6 | 29.35 |
| 18 | −572.200 | (Variable) | | | 29.18 |
| 19 | −50.704 | 1.30 | 1.71700 | 47.9 | 19.97 |
| 20 | 35.266 | 3.07 | 1.84649 | 23.9 | 20.68 |
| 21 | 184.392 | (Variable) | | | 20.91 |
| 22 | 385.895 | 5.34 | 1.62041 | 60.3 | 33.28 |
| 23 | −46.412 | 0.10 | | | 33.74 |
| 24 | 125.973 | 5.38 | 1.49700 | 81.5 | 33.43 |
| 25 | −149.518 | (Variable) | | | 32.98 |
| 26 (Stop) | ∞ | 0.10 | | | 31.52 |
| 27 | 48.263 | 3.85 | 1.48749 | 70.2 | 30.69 |
| 28 | 262.060 | 1.30 | 1.63980 | 34.5 | 29.92 |
| 29 | 109.441 | 2.99 | | | 29.18 |
| 30 | 39.326 | 8.48 | 1.48749 | 70.2 | 27.03 |
| 31 | −44.433 | 1.50 | 1.88300 | 40.8 | 24.56 |
| 32 | 35.012 | 50.00 | | | 23.00 |
| 33 | −132.306 | 3.56 | 1.48749 | 70.2 | 25.24 |
| 34 | −35.583 | 1.56 | | | 25.62 |
| 35 | 85.061 | 1.20 | 1.78590 | 44.2 | 25.34 |
| 36 | 28.578 | 5.55 | 1.51742 | 52.4 | 24.83 |
| 37 | −86.513 | 0.66 | | | 24.79 |
| 38 | 53.800 | 5.21 | 1.51742 | 52.4 | 24.23 |
| 39 | −43.661 | 1.20 | 1.83481 | 42.7 | 23.61 |
| 40 | 58.426 | 1.98 | | | 23.09 |
| 41 | 98.989 | 4.05 | 1.48749 | 70.2 | 23.23 |
| 42 | −44.946 | 3.80 | | | 23.21 |
| 43 | ∞ | 33.00 | 1.60859 | 46.4 | 40.00 |
| 44 | ∞ | 13.20 | 1.51680 | 64.2 | 40.00 |
| 45 | ∞ | 8.00 | | | 40.00 |
| Image plane | ∞ | | | | |

Various data

| | | |
|---|---|---|
| Zoom ratio | 40.00 | |
| Focal length | 10.00 | 400.00 |
| F-number | 2.20 | 3.80 |
| Half angle of view | 28.81 | 0.79 |
| Image height | 5.50 | 5.50 |
| Entire lens length | 371.37 | 371.37 |
| BF | 8.00 | 8.00 |
| d10 | 0.65 | 91.76 |
| d18 | 98.29 | 10.83 |
| d21 | 25.66 | 2.10 |
| d25 | 0.10 | 20.00 |
| Incidence pupil position | 77.60 | 1972.98 |
| Exit pupil position | 180.71 | 180.71 |
| Front principal point position | 88.18 | 3299.38 |
| Rear principal point position | −2.00 | −391.99 |

Zoom lens unit data

| Unit | First surface | Focal length | Lens structure length | Front principal point position | Rear principal point position |
|---|---|---|---|---|---|
| 1 | 1 | 127.00 | 64.45 | 35.19 | −9.05 |
| 2 | 11 | −23.00 | 15.83 | 2.53 | −9.31 |
| 3 | 19 | −66.10 | 4.37 | 0.55 | −1.85 |
| 4 | 22 | 45.50 | 10.82 | 3.65 | −3.40 |
| 5 | 26 | 56.09 | 143.19 | 79.09 | −12.13 |

Single lens data

| Lens | First surface | Focal length |
|---|---|---|
| 1 | 1 | −165.08 |
| 2 | 3 | 249.92 |
| 3 | 5 | 283.35 |
| 4 | 7 | 344.09 |
| 5 | 9 | 340.48 |
| 6 | 11 | −39.95 |
| 7 | 13 | −33.38 |
| 8 | 15 | 35.92 |
| 9 | 17 | −64.71 |
| 10 | 19 | −28.68 |
| 11 | 20 | 50.53 |
| 12 | 22 | 66.83 |
| 13 | 24 | 138.06 |
| 14 | 27 | 120.23 |
| 15 | 28 | −292.69 |
| 16 | 30 | 44.12 |
| 17 | 31 | −21.85 |
| 18 | 33 | 98.32 |
| 19 | 35 | −54.99 |
| 20 | 36 | 42.02 |
| 21 | 38 | 47.23 |
| 22 | 39 | −29.61 |
| 23 | 41 | 63.78 |
| 24 | 43 | 0.00 |
| 25 | 44 | 0.00 |

Numerical Embodiment 3

Unit: mm

Surface data

| Surface No. | r | d | nd | vd | Effective diameter |
|---|---|---|---|---|---|
| 1 | −6470.438 | 4.65 | 1.83481 | 42.7 | 147.92 |
| 2 | 263.789 | 0.41 | | | 144.45 |
| 3 | 257.191 | 21.87 | 1.43387 | 95.1 | 144.49 |
| 4 | −302.578 | 19.00 | | | 144.10 |
| 5 | 621.481 | 7.90 | 1.43387 | 95.1 | 130.67 |
| 6 | −1303.007 | 0.31 | | | 129.64 |
| 7 | 309.039 | 8.29 | 1.43387 | 95.1 | 124.82 |
| 8 | 2256.312 | 0.31 | | | 123.36 |
| 9 | 123.648 | 12.21 | 1.43387 | 95.1 | 114.42 |
| 10 | 354.946 | (Variable) | | | 113.07 |
| 11 | 73.350 | 1.52 | 1.88300 | 40.8 | 45.94 |
| 12 | 33.140 | 10.50 | | | 40.69 |
| 13 | −62.561 | 1.37 | 1.81600 | 46.6 | 40.59 |
| 14 | 795.040 | 0.12 | | | 40.36 |
| 15 | 379.309 | 6.48 | 1.80809 | 22.8 | 40.34 |
| 16 | −44.844 | 1.05 | | | 40.25 |
| 17 | −42.112 | 1.67 | 1.81600 | 46.6 | 38.77 |
| 18 | −869.744 | (Variable) | | | 38.45 |
| 19 | −50.600 | 1.30 | 1.71700 | 47.9 | 27.83 |
| 20 | 52.827 | 4.68 | 1.84649 | 23.9 | 28.95 |
| 21 | 257.215 | (Variable) | | | 29.42 |
| 22 | 169.314 | 6.97 | 1.62041 | 60.3 | 37.94 |
| 23 | −65.411 | 0.15 | | | 38.38 |
| 24 | 165.633 | 6.27 | 1.51633 | 64.1 | 37.80 |

-continued

Unit: mm

| | | | | | |
|---|---|---|---|---|---|
| 25 | −81.067 | (Variable) | | | 37.28 |
| 26 (Stop) | ∞ | 3.00 | | | 35.05 |
| 27 | 35.669 | 4.73 | 1.48749 | 70.2 | 31.47 |
| 28 | 173.744 | 1.30 | 1.63980 | 34.5 | 30.48 |
| 29 | 71.458 | 2.98 | | | 29.38 |
| 30 | 84.570 | 5.43 | 1.48749 | 70.2 | 27.88 |
| 31 | −40.308 | 1.50 | 1.88300 | 40.8 | 26.91 |
| 32 | 53.151 | 48.00 | | | 25.74 |
| 33 | −103.809 | 3.77 | 1.49700 | 81.5 | 27.09 |
| 34 | −33.997 | 0.47 | | | 27.29 |
| 35 | 68.848 | 3.15 | 1.51742 | 52.4 | 25.98 |
| 36 | 257.071 | 1.47 | | | 25.27 |
| 37 | 23.946 | 6.16 | 1.51742 | 52.4 | 23.50 |
| 38 | −119.197 | 1.20 | 1.83481 | 42.7 | 22.19 |
| 39 | 25.438 | 2.02 | | | 20.69 |
| 40 | 37.340 | 3.52 | 1.48749 | 70.2 | 20.73 |
| 41 | 460.304 | 3.80 | | | 20.36 |
| 42 | ∞ | 33.00 | 1.60859 | 46.4 | 40.00 |
| 43 | ∞ | 13.20 | 1.51680 | 64.2 | 40.00 |
| 44 | ∞ | 7.72 | | | 40.00 |
| Image plane | ∞ | | | | |

Various data

| Zoom ratio | 36.00 | |
|---|---|---|
| Focal length | 11.00 | 396.00 |
| F-number | 2.20 | 3.38 |
| Half angle of field | 26.57 | 0.80 |
| Image height | 5.50 | 5.50 |
| Entire lens length | 451.65 | 451.65 |
| BF | 7.72 | 7.72 |
| d10 | 0.49 | 168.59 |
| d18 | 168.90 | 7.41 |
| d21 | 16.53 | 5.24 |
| d25 | 2.29 | 6.97 |
| Incidence pupil position | 103.60 | 2407.73 |
| Exit pupil position | 7063.13 | 7063.13 |
| Front principal point position | 114.61 | 2825.96 |
| Rear principal point position | −3.28 | −388.28 |

Zoom lens unit data

| Unit | First surface | Focal length | Lens structure length | Front principal point position | Rear principal point position |
|---|---|---|---|---|---|
| 1 | 1 | 220.00 | 74.95 | 47.32 | −8.23 |
| 2 | 11 | −35.00 | 22.70 | 6.28 | −10.51 |
| 3 | 19 | −66.10 | 5.98 | 0.59 | −2.66 |
| 4 | 22 | 45.50 | 13.39 | 4.92 | −3.84 |
| 5 | 26 | 74.73 | 138.71 | 75.53 | −15.60 |

Single lens data

| Lens | First surface | Focal length |
|---|---|---|
| 1 | 1 | −301.84 |
| 2 | 3 | 323.45 |
| 3 | 5 | 968.61 |
| 4 | 7 | 822.20 |
| 5 | 9 | 429.37 |
| 6 | 11 | −69.30 |
| 7 | 13 | −70.66 |
| 8 | 15 | 49.46 |
| 9 | 17 | −54.01 |
| 10 | 19 | −35.68 |
| 11 | 20 | 76.96 |
| 12 | 22 | 76.62 |
| 13 | 24 | 105.94 |
| 14 | 27 | 90.74 |
| 15 | 28 | −189.37 |
| 16 | 30 | 56.61 |
| 17 | 31 | −25.62 |
| 18 | 33 | 99.63 |
| 19 | 35 | 179.88 |
| 20 | 37 | 38.94 |
| 21 | 38 | −24.88 |

-continued

Unit: mm

| | | |
|---|---|---|
| 22 | 40 | 82.85 |
| 23 | 42 | 0.00 |
| 24 | 43 | 0.00 |

Numerical Embodiment 4

Unit: mm

Surface data

| Surface No. | r | d | nd | vd | Effective diameter |
|---|---|---|---|---|---|
| 1 | −1225.539 | 3.00 | 1.83481 | 42.7 | 108.69 |
| 2 | 165.517 | 1.10 | | | 105.77 |
| 3 | 173.193 | 15.09 | 1.43387 | 95.1 | 106.34 |
| 4 | −299.252 | 6.88 | | | 106.84 |
| 5 | 162.204 | 15.24 | 1.43387 | 95.1 | 111.41 |
| 6 | −441.043 | 0.20 | | | 111.27 |
| 7 | 127.481 | 12.29 | 1.43387 | 95.1 | 107.77 |
| 8 | 976.944 | 0.20 | | | 106.99 |
| 9 | 91.332 | 10.09 | 1.43387 | 95.1 | 99.25 |
| 10 | 191.653 | (Variable) | | | 97.85 |
| 11 | 166.661 | 1.00 | 1.88300 | 40.8 | 33.65 |
| 12 | 27.236 | 6.81 | | | 29.38 |
| 13 | −48.075 | 0.90 | 1.81600 | 46.6 | 29.22 |
| 14 | 52.686 | 1.59 | | | 28.92 |
| 15 | 77.830 | 5.71 | 1.80809 | 22.8 | 29.29 |
| 16 | −48.026 | 0.35 | | | 29.35 |
| 17 | −66.391 | 1.10 | 1.81600 | 46.6 | 28.82 |
| 18 | −572.200 | (Variable) | | | 28.67 |
| 19 | −50.175 | 1.30 | 1.71700 | 47.9 | 19.27 |
| 20 | 45.885 | 2.74 | 1.84649 | 23.9 | 19.83 |
| 21 | 235.814 | (Variable) | | | 20.06 |
| 22 | 181.801 | 5.05 | 1.62041 | 60.3 | 33.68 |
| 23 | −59.656 | 0.10 | | | 34.04 |
| 24 | 115.764 | 4.73 | 1.51633 | 64.1 | 33.86 |
| 25 | −87.373 | 0.12 | | | 33.61 |
| 26 | 76.706 | 3.20 | 1.48749 | 70.2 | 32.16 |
| 27 | 306.193 | 1.30 | 1.63980 | 34.5 | 31.36 |
| 28 | 237.299 | (Variable) | | | 30.82 |
| 29 (Stop) | ∞ | 0.10 | | | 29.60 |
| 30 | 38.068 | 8.99 | 1.48749 | 70.2 | 28.03 |
| 31 | −43.209 | 1.50 | 1.88300 | 40.8 | 25.19 |
| 32 | 31.781 | 50.00 | | | 23.27 |
| 33 | −110.294 | 3.58 | 1.48749 | 70.2 | 25.16 |
| 34 | −33.720 | 2.00 | | | 25.35 |
| 35 | 85.972 | 1.20 | 1.78590 | 44.2 | 24.15 |
| 36 | 28.212 | 5.97 | 1.51742 | 52.4 | 23.69 |
| 37 | −74.786 | 2.00 | | | 23.64 |
| 38 | 55.429 | 4.61 | 1.51742 | 52.4 | 22.81 |
| 39 | −52.088 | 1.20 | 1.83481 | 42.7 | 22.20 |
| 40 | 55.850 | 1.58 | | | 21.69 |
| 41 | 74.974 | 3.71 | 1.48749 | 70.2 | 21.77 |
| 42 | −61.862 | 3.80 | | | 21.66 |
| 43 | ∞ | 33.00 | 1.60859 | 46.4 | 40.00 |
| 44 | ∞ | 13.20 | 1.51680 | 64.2 | 40.00 |
| 45 | ∞ | 6.80 | | | 40.00 |
| Image plane | ∞ | | | | |

Various data

| Zoom ratio | 40.00 | |
|---|---|---|
| Focal length | 10.00 | 400.02 |
| F-number | 2.20 | 3.80 |
| Half angle of field | 28.81 | 0.79 |
| Image height | 5.50 | 5.50 |
| Entire lens length | 364.63 | 364.63 |
| BF | 6.80 | 6.80 |
| d10 | 0.66 | 91.91 |
| d18 | 87.71 | 19.19 |
| d21 | 31.45 | 1.89 |

-continued

Unit: mm

| | | |
|---|---|---|
| d28 | 1.48 | 8.32 |
| Incidence pupil position | 77.09 | 2144.65 |
| Exit pupil position | 274.54 | 274.54 |
| Front principal point position | 87.47 | 3142.33 |
| Rear principal point position | −3.20 | −393.22 |

Zoom lens unit data

| Unit | First surface | Focal length | Lens structure length | Front principal point position | Rear principal point position |
|---|---|---|---|---|---|
| 1 | 1 | 127.00 | 64.10 | 34.23 | −10.00 |
| 2 | 11 | −23.00 | 17.45 | 1.92 | −11.78 |
| 3 | 19 | −66.10 | 4.04 | 0.39 | −1.83 |
| 4 | 22 | 36.00 | 14.50 | 3.73 | −5.72 |
| 5 | 29 | 51.58 | 136.43 | 64.32 | 14.27 |

Single lens data

| Lens | First surface | Focal length |
|---|---|---|
| 1 | 1 | −173.54 |
| 2 | 3 | 254.68 |
| 3 | 5 | 274.75 |
| 4 | 7 | 335.60 |
| 5 | 9 | 389.27 |
| 6 | 11 | −36.78 |
| 7 | 13 | −30.53 |
| 8 | 15 | 37.13 |
| 9 | 17 | −91.66 |
| 10 | 19 | −33.07 |
| 11 | 20 | 66.21 |
| 12 | 22 | 72.70 |
| 13 | 24 | 96.85 |
| 14 | 26 | 208.28 |
| 15 | 27 | −1649.37 |
| 16 | 30 | 42.93 |
| 17 | 31 | −20.43 |
| 18 | 33 | 97.79 |
| 19 | 35 | −53.64 |
| 20 | 36 | 40.21 |
| 21 | 38 | 52.43 |
| 22 | 39 | −31.94 |
| 23 | 41 | 69.92 |
| 24 | 43 | 0.00 |
| 25 | 44 | 0.00 |

Numerical Embodiment 5

Unit: mm

Surface data

| Surface No. | r | d | nd | vd | Effective diameter |
|---|---|---|---|---|---|
| 1 | −160.741 | 2.20 | 1.80100 | 35.0 | 79.29 |
| 2 | 1575.477 | 4.57 | | | 77.25 |
| 3 | 391.677 | 2.20 | 1.84666 | 23.8 | 75.15 |
| 4 | 86.467 | 14.10 | 1.43875 | 94.9 | 73.22 |
| 5 | −166.243 | 0.50 | | | 73.24 |
| 6 | 225.272 | 7.29 | 1.43387 | 95.1 | 72.38 |
| 7 | −250.453 | 5.11 | | | 72.13 |
| 8 | 94.264 | 9.24 | 1.72916 | 54.7 | 69.21 |
| 9 | −448.372 | 0.15 | | | 68.58 |
| 10 | 53.318 | 5.56 | 1.78800 | 47.4 | 58.64 |
| 11 | 101.757 | (Variable) | | | 57.61 |
| 12* | 239.088 | 1.00 | 1.83481 | 42.7 | 28.89 |
| 13 | 14.185 | 5.69 | | | 21.90 |
| 14 | −292.596 | 6.33 | 1.80809 | 22.8 | 21.69 |
| 15 | −14.548 | 0.75 | 1.83481 | 42.7 | 21.04 |
| 16 | 29.970 | 0.66 | | | 19.10 |
| 17 | 21.967 | 5.12 | 1.60342 | 38.0 | 19.15 |
| 18 | −32.149 | 1.00 | | | 18.63 |
| 19 | −20.438 | 0.75 | 1.83481 | 42.7 | 18.42 |
| 20 | −66.458 | (Variable) | | | 18.44 |
| 21 | −24.262 | 0.75 | 1.75500 | 52.3 | 17.71 |
| 22 | 40.422 | 3.23 | 1.84666 | 23.8 | 19.39 |
| 23 | −370.179 | (Variable) | | | 20.18 |
| 24 | −70.801 | 3.47 | 1.67003 | 47.2 | 23.83 |
| 25 | −25.703 | 0.20 | | | 24.62 |
| 26 | 44.707 | 3.90 | 1.48749 | 70.2 | 26.06 |
| 27 | −154.148 | (Variable) | | | 26.03 |
| 28 (Stop) | ∞ | 1.34 | | | 25.51 |
| 29 | 90.425 | 5.79 | 1.50127 | 56.5 | 25.25 |
| 30 | −32.267 | 1.20 | 1.88300 | 40.8 | 24.84 |
| 31 | −471.830 | 33.00 | | | 24.97 |
| 32 | 64.432 | 5.22 | 1.49700 | 81.5 | 25.74 |
| 33 | −43.149 | 0.50 | | | 25.51 |
| 34 | −138.707 | 1.40 | 1.83400 | 37.2 | 24.52 |
| 35 | 27.240 | 5.20 | 1.48749 | 70.2 | 23.62 |
| 36 | −366.027 | 2.12 | | | 23.73 |
| 37 | 50.056 | 7.49 | 1.50127 | 56.5 | 24.52 |
| 38 | −25.415 | 1.40 | 1.88300 | 40.8 | 24.42 |
| 39 | −120.075 | 1.32 | | | 25.16 |
| 40 | 48.467 | 4.97 | 1.51742 | 52.4 | 25.82 |
| 41 | −59.348 | 4.00 | | | 25.68 |
| 42 | ∞ | 33.00 | 1.60859 | 46.4 | 40.00 |
| 43 | ∞ | 13.20 | 1.51633 | 64.2 | 40.00 |
| 44 | ∞ | 6.89 | | | 40.00 |
| Image plane | ∞ | | | | |

Aspherical surface data
Twelfth surface

K = 2.16896e+002  A4 = 1.32449e−005  A6 = −3.50256e−008
A8 = 1.29011e−010  A10 = −3.76910e−013

Various data

| | | |
|---|---|---|
| Zoom ratio | 17.00 | |
| Focal length | 8.00 | 136.00 |
| F-number | 1.90 | 2.44 |
| Half angle of field | 34.51 | 2.32 |
| Image height | 5.50 | 5.50 |
| Entire lens length | 266.09 | 266.09 |
| BF | 6.89 | 6.89 |
| d11 | 0.82 | 39.69 |
| d20 | 47.34 | 2.00 |
| d23 | 5.29 | 1.75 |
| d27 | 0.84 | 10.86 |
| Incidence pupil position | 48.98 | 519.75 |
| Exit pupil position | 297.82 | 297.82 |
| Front principal point position | 57.20 | 719.32 |
| Rear principal point position | −1.11 | −129.11 |

Zoom lens unit data

| Unit | First surface | Focal length | Lens structure length | Front principal point position | Rear principal point position |
|---|---|---|---|---|---|
| 1 | 1 | 55.94 | 50.91 | 31.69 | 1.01 |
| 2 | 12 | −12.86 | 21.30 | 2.58 | −11.24 |
| 3 | 21 | −37.90 | 3.98 | −0.23 | −2.41 |
| 4 | 24 | 31.94 | 7.57 | 3.00 | −1.85 |
| 5 | 28 | 46.78 | 121.14 | 54.51 | −32.02 |

Single lens data

| Lens | First surface | Focal length |
|---|---|---|
| 1 | 1 | −180.77 |
| 2 | 3 | −130.21 |
| 3 | 4 | 131.56 |
| 4 | 6 | 273.94 |
| 5 | 8 | 107.13 |

-continued

Unit: mm

| | | |
|---|---|---|
| 6 | 10 | 134.60 |
| 7 | 12 | −18.00 |
| 8 | 14 | 18.56 |
| 9 | 15 | −11.58 |
| 10 | 17 | 22.29 |
| 11 | 19 | −35.42 |
| 12 | 21 | −19.89 |
| 13 | 22 | 42.78 |
| 14 | 24 | 58.12 |
| 15 | 26 | 71.31 |
| 16 | 29 | 48.00 |
| 17 | 30 | −39.05 |
| 18 | 32 | 52.70 |
| 19 | 34 | −27.02 |
| 20 | 35 | 52.06 |
| 21 | 37 | 34.64 |
| 22 | 38 | −36.55 |
| 23 | 40 | 52.15 |
| 24 | 42 | 0.00 |
| 25 | 43 | 0.00 |

Numerical Embodiment 6

Unit: mm

Surface data

| Surface No. | r | d | nd | vd | Effective diameter |
|---|---|---|---|---|---|
| 1* | 165.849 | 2.50 | 1.77250 | 49.6 | 90.47 |
| 2 | 36.360 | 18.13 | | | 65.60 |
| 3 | 183.661 | 1.85 | 1.75500 | 52.3 | 65.33 |
| 4 | 64.874 | 14.47 | | | 61.70 |
| 5 | −90.184 | 1.75 | 1.81600 | 46.6 | 61.49 |
| 6 | 1756.478 | 0.20 | | | 63.30 |
| 7 | 120.118 | 5.46 | 1.76182 | 26.5 | 65.58 |
| 8 | 787.587 | 2.35 | | | 65.62 |
| 9 | 2156.112 | 8.09 | 1.62041 | 60.3 | 65.82 |
| 10* | −81.796 | 5.04 | | | 65.90 |
| 11 | 295.901 | 9.76 | 1.49700 | 81.5 | 66.01 |
| 12 | −92.284 | 1.65 | 1.80100 | 35.0 | 66.12 |
| 13 | −121.041 | 0.20 | | | 66.68 |
| 14 | 96.813 | 1.65 | 2.00330 | 28.3 | 65.27 |
| 15 | 49.087 | 13.84 | 1.49700 | 81.5 | 62.27 |
| 16 | −712.253 | 0.20 | | | 62.31 |
| 17 | 137.308 | 8.08 | 1.48749 | 70.2 | 62.44 |
| 18 | −189.895 | 0.20 | | | 62.18 |
| 19 | 93.630 | 8.96 | 1.62041 | 60.3 | 59.36 |
| 20 | −165.878 | (Variable) | | | 58.62 |
| 21 | 36.239 | 0.75 | 1.88300 | 40.8 | 24.90 |
| 22 | 24.388 | 2.73 | | | 22.99 |
| 23 | 147.885 | 0.75 | 1.88300 | 40.8 | 22.54 |
| 24 | 16.833 | 4.88 | | | 19.70 |
| 25 | −64.198 | 5.64 | 1.76182 | 26.5 | 19.40 |
| 26 | −13.083 | 0.80 | 1.88300 | 40.8 | 19.31 |
| 27 | −602.692 | 0.20 | | | 19.80 |
| 28 | 34.611 | 2.34 | 1.78472 | 25.7 | 20.07 |
| 29 | 191.329 | (Variable) | | | 19.87 |
| 30 | −27.266 | 0.75 | 1.77250 | 49.6 | 16.41 |
| 31 | 51.141 | 1.90 | 1.80809 | 22.8 | 17.46 |
| 32 | −165.052 | (Variable) | | | 17.79 |
| 33 | 314.871 | 2.03 | 1.58913 | 61.1 | 24.28 |
| 34 | −189.004 | (Variable) | | | 24.74 |
| 35 (Stop) | ∞ | 1.00 | | | 25.12 |
| 36 | 102.929 | 3.95 | 1.64850 | 53.0 | 25.96 |
| 37 | −78.141 | 0.20 | | | 26.30 |
| 38 | 61.204 | 6.46 | 1.51742 | 52.4 | 26.45 |
| 39 | −30.501 | 1.20 | 1.83481 | 42.7 | 26.21 |
| 40 | −164.664 | 32.00 | | | 26.48 |
| 41 | 99.273 | 5.08 | 1.64850 | 53.0 | 26.37 |
| 42 | −40.633 | 4.60 | | | 26.16 |
| 43 | −38.211 | 1.20 | 1.88300 | 40.8 | 22.65 |
| 44 | 23.622 | 6.34 | 1.51633 | 64.1 | 22.44 |
| 45 | −53.232 | 0.19 | | | 23.27 |
| 46 | 36.618 | 8.04 | 1.48749 | 70.2 | 24.73 |
| 47 | −23.147 | 1.20 | 1.88300 | 40.8 | 24.77 |
| 48 | −125.102 | 0.20 | | | 25.89 |
| 49 | 120.257 | 5.75 | 1.62041 | 60.3 | 26.42 |
| 50 | −34.145 | 4.00 | | | 26.69 |
| 51 | ∞ | 33.00 | 1.60859 | 46.4 | 40.00 |
| 52 | ∞ | 13.20 | 1.51680 | 64.2 | 40.00 |
| 53 | ∞ | 8.17 | | | 40.00 |
| Image plane | ∞ | | | | |

Aspherical surface data

First surface

K = 6.52240e+000   A4 = 4.27610e−007   A6 = −1.49719e−011
A8 = 9.45187e−016  A10 = −1.64736e−018  A3 = −3.40264e−006
A5 = 4.23765e−009  A7 = −2.56601e−012   A9 = 2.51021e−016

Tenth surface

K = −1.65695e+000  A4 = −1.39543e−007   A6 = −4.32716e−010
A8 = 8.00630e−013  A10 = 4.53467e−017   A3 = 4.33724e−007
A5 = 2.25435e−008  A7 = −1.47654e−011   A9 = −1.25067e−014

Various data

| | | |
|---|---|---|
| Zoom ratio | 9.00 | |
| Focal length | 4.70 | 42.30 |
| F-number | 1.90 | 2.06 |
| Half angle of field | 49.48 | 7.41 |
| Image height | 5.50 | 5.50 |
| Entire lens length | 317.93 | 317.93 |
| BF | 8.17 | 8.17 |
| d20 | 0.46 | 40.76 |
| d29 | 43.59 | 3.71 |
| d32 | 10.51 | 0.31 |
| d34 | 0.42 | 10.20 |
| Incidence pupil position | 37.80 | 103.70 |
| Exit pupil position | 198.55 | 198.55 |
| Front principal point position | 42.61 | 155.39 |
| Rear principal point position | 3.47 | −34.13 |

Zoom lens unit data

| Unit | First surface | Focal length | Lens structure length | Front principal point position | Rear principal point position |
|---|---|---|---|---|---|
| 1 | 1 | 30.00 | 104.39 | 48.87 | 34.17 |
| 2 | 21 | −17.50 | 18.09 | 2.35 | −11.81 |
| 3 | 30 | −44.40 | 2.65 | −0.34 | −1.82 |
| 4 | 33 | 200.00 | 2.03 | 0.80 | −0.48 |
| 5 | 35 | 58.86 | 127.62 | 73.21 | −101.79 |

Single lens data

| Lens | First surface | Focal length |
|---|---|---|
| 1 | 1 | −60.51 |
| 2 | 3 | −133.14 |
| 3 | 5 | −104.54 |
| 4 | 7 | 183.76 |
| 5 | 9 | 126.70 |
| 6 | 11 | 142.32 |
| 7 | 12 | −494.33 |
| 8 | 14 | −100.16 |
| 9 | 15 | 92.69 |
| 10 | 17 | 164.25 |
| 11 | 19 | 97.38 |
| 12 | 21 | −86.54 |
| 13 | 23 | −21.44 |
| 14 | 25 | 20.40 |
| 15 | 26 | −15.07 |

-continued

Unit: mm

| | | |
|---|---|---|
| 16 | 28 | 53.01 |
| 17 | 30 | −22.82 |
| 18 | 31 | 48.01 |
| 19 | 33 | 200.00 |
| 20 | 36 | 68.78 |
| 21 | 38 | 40.13 |
| 22 | 39 | −44.78 |
| 23 | 41 | 44.90 |
| 24 | 43 | −16.29 |
| 25 | 44 | 32.49 |
| 26 | 46 | 30.33 |
| 27 | 47 | −32.16 |
| 28 | 49 | 43.32 |
| 29 | 51 | 0.00 |
| 30 | 52 | 0.00 |

TABLE 1

Corresponding values of the respective conditional expressions in Numerical Embodiments 1 to 6

| Conditional expression | Numerical Embodiment | | | | | |
|---|---|---|---|---|---|---|
| | 1 | 2 | 3 | 4 | 5 | 6 |
| (1) $|\beta 2w|$ | 0.252 | 0.251 | 0.206 | 0.252 | 0.316 | 0.395 |
| (2) $|\beta 2t/\beta 2w|$ | 2469 | 193 | 91 | 2778 | 22 | 11 |
| (3) $|f2/fw|$ | 2.30 | 2.30 | 3.18 | 2.30 | 1.61 | 3.72 |
| (4) $|f4/fw|$ | 4.55 | 4.55 | 4.14 | 3.60 | 3.99 | 42.55 |
| (5) TL4/WL4 | 8.37 | 100.52 | 1.88 | 5.34 | 5.59 | 7.88 |
| (6) $|\beta 2t/\beta 2w|/\beta all$ | 61.73 | 4.83 | 2.53 | 69.45 | 1.29 | 1.22 |

Next, an image pickup apparatus (television camera system) having the zoom lens according to each embodiment as a photographing optical system is described with reference to FIG. 14. Referring to FIG. 14, an image pickup apparatus 125 includes a zoom lens 101, which is any one of the zoom lenses according to Embodiments 1 to 6. The zoom lens 101 may be detachably mounted on a camera 124, to thereby constitute the image pickup apparatus 125. The zoom lens 101 includes a first lens unit F, a magnification varying unit LZ, and the fifth lens unit R for imaging. The first lens unit F includes a focusing lens unit.

The magnification varying unit LZ includes a second lens unit which moves along the optical axis for magnification variation. In addition, the magnification varying unit LZ includes a third lens unit and a fourth lens unit which move along the optical axis for correcting the image plane variation due to magnification variation or for magnification variation.

Further, the zoom lens 101 includes an aperture stop SP. The fifth lens unit R includes a lens unit IE, which may enter into or exit from the optical path. The lens unit IE may change the range of the focal length of the entire system of the zoom lens 101 to the longer one. The fifth lens unit R may not include the lens unit IE. In addition, the zoom lens 101 includes driving mechanisms 114 and 115, such as a helicoid or a cam, which drive the first lens unit F and the magnification varying unit LZ, respectively, along the optical axis.

The image pickup apparatus 125 includes motors (driving units) 116 to 118, which electrically drive the driving mechanisms 114 and 115 and the aperture stop SP, respectively. Detectors 119 to 121, such as an encoder, a potentiometer, or a photo-sensor, are configured to detect the positions of the first lens unit F and the magnification varying unit LZ on the optical axis, and the aperture diameter of the aperture stop SP.

The camera 124 includes a glass block 109, which is equivalent to an optical filter or a color separation prism provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control the driving of the camera 124 and the zoom lens main body 101, respectively. By applying the zoom lens according to the present invention to a television camera as described above, an image pickup apparatus having a high optical performance may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-014071, filed Jan. 26, 2012, which is hereby incorporated by reference herein in its entirety.

What is claimed is:

1. A zoom lens comprising, in order from an object side to an image side:
   a first lens unit having positive refractive power, which does not move for zooming, the first lens unit including a lens unit which moves for focusing;
   a second lens unit having negative refractive power, which moves for zooming;
   a third lens unit having negative refractive power, which moves for zooming;
   a fourth lens unit having positive refractive power, which moves for zooming; and
   a fifth lens unit having positive refractive power, which does not move for zooming,
   wherein an interval between the fourth lens unit and the fifth lens unit becomes largest at a telephoto end in zooming, and the following expressions are satisfied:

$0.19 < |\beta 2w| < 0.42$; and $10.0 < |\beta 2t/\beta 2w|$, where $\beta 2w$ and $\beta 2t$ represent lateral magnifications of the second lens unit at a wide-angle end and at the telephoto end, respectively.

2. A zoom lens according to claim 1, wherein the following expression is satisfied:

$1.4 < |f2/fw| < 4.0$; and $3.3<|f4/fw|<50.0$, where f2 and f4 represent focal lengths of the second lens unit and the fourth lens unit, respectively, and fw represents a focal length of an entire system at the wide-angle end.

3. A zoom lens according to claim 1, wherein the following expressions are satisfied:

$1.5<TL4/WL4<120.0$, where WL4 and TL4 represent intervals between the fourth lens unit and the fifth lens unit at the wide-angle end and at the telephoto end, respectively.

4. A zoom lens according to claim 1, wherein in zooming from the wide-angle end to the telephoto end, the second lens unit moves from the object side to the image side, the third lens unit moves along a locus convex toward the object side, and the fourth lens unit moves from the image side to the object side.

5. An image pickup apparatus comprising:
a zoom lens, including, in order from an object side to an image side:
- a first lens unit having positive refractive power, which does not move for zooming, the first lens unit including a lens unit which moves for focusing;
- a second lens unit having negative refractive power, which moves for zooming;
- a third lens unit having negative refractive power, which moves for zooming;
- a fourth lens unit having positive refractive power, which moves for zooming; and
- a fifth lens unit having positive refractive power, which does not move for zooming,
wherein an interval between the fourth lens unit and the fifth lens unit becomes largest at a telephoto end in zooming, and the following expressions are satisfied:

$0.19<|\beta 2w|<0.42$; and $10.0<|\beta 2t/\beta 2w|$, where $\beta 2w$ and $\beta 2t$ represent lateral magnifications of the second lens unit at a wide-angle end and at the telephoto end, respectively; and
a solid-state image pickup element for receiving light of an image formed by the zoom lens.

* * * * *